United States Patent
Huang et al.

(10) Patent No.: US 12,069,592 B2
(45) Date of Patent: Aug. 20, 2024

(54) DATA TRANSMISSION METHOD AND DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 402 days.

(21) Appl. No.: 17/602,768

(22) PCT Filed: Apr. 9, 2020

(86) PCT No.: PCT/CN2020/083974
§ 371 (c)(1),
(2) Date: Oct. 10, 2021

(87) PCT Pub. No.: WO2020/207438
PCT Pub. Date: Oct. 15, 2020

(65) Prior Publication Data
US 2022/0182950 A1 Jun. 9, 2022

(30) Foreign Application Priority Data
Apr. 10, 2019 (CN) .......................... 201910286796.4

(51) Int. Cl.
*H04W 52/00* (2009.01)
*H04L 5/00* (2006.01)
(Continued)

(52) U.S. Cl.
CPC ......... *H04W 52/367* (2013.01); *H04L 5/0051* (2013.01); *H04W 52/14* (2013.01);
(Continued)

(58) Field of Classification Search
CPC . H04W 52/367; H04W 52/14; H04W 52/325; H04W 52/42; H04W 72/1263; H04L 5/0051
See application file for complete search history.

(56) References Cited

U.S. PATENT DOCUMENTS

2010/0246561 A1 9/2010 Shin et al.
2013/0329543 A1* 12/2013 Ogawa ................. H04B 7/0413
370/209
(Continued)

FOREIGN PATENT DOCUMENTS

CN 102036301 A 4/2011
CN 102356675 A 2/2012
(Continued)

OTHER PUBLICATIONS

Extended European Search Report for European Patent Application 20786864.7, issued on May 13, 2022.
(Continued)

Primary Examiner — Erika A Washington
(74) Attorney, Agent, or Firm — Ladas & Parry, LLP

(57) ABSTRACT

The present disclosure provides a data transmission method and device. The method includes: sending a first signal and a demodulation reference signal DMRS corresponding to the first signal to a second device; wherein the first signal includes at least one data stream, and each data stream corresponds to one DMRS port, one DMRS port corresponds to one or more of the following in different subbands: different power amplifiers, different sounding reference signal ports, or different first signal ports.

25 Claims, 8 Drawing Sheets

--- sending a first signal and send a demodulation reference signal (DMRS) corresponding to the first signal to a second device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports

401

(51) Int. Cl.
   *H04W 52/14* (2009.01)
   *H04W 52/32* (2009.01)
   *H04W 52/36* (2009.01)
   *H04W 52/42* (2009.01)
   *H04W 72/044* (2023.01)
   *H04W 72/1263* (2023.01)

(52) U.S. Cl.
   CPC ......... *H04W 52/325* (2013.01); *H04W 52/42* (2013.01); *H04W 72/044* (2013.01); *H04W 72/1263* (2013.01)

(56) References Cited

U.S. PATENT DOCUMENTS

| | | |
|---|---|---|
| 2014/0219203 A1 | 8/2014 | Lin et al. |
| 2014/0314038 A1 | 10/2014 | Seo et al. |
| 2015/0063281 A1 | 3/2015 | Xu |
| 2015/0230213 A1 | 8/2015 | Kim et al. |
| 2018/0006706 A1 | 1/2018 | Cheng et al. |
| 2019/0052424 A1 | 2/2019 | Manolakos et al. |
| 2019/0052502 A1 | 2/2019 | Ren et al. |
| 2019/0312697 A1 | 10/2019 | Li et al. |
| 2019/0327056 A1* | 10/2019 | Chen .................. H04L 5/00 |
| 2020/0021411 A1 | 1/2020 | Ren et al. |
| 2020/0287687 A1 | 9/2020 | Li et al. |
| 2021/0044400 A1 | 2/2021 | Jiang et al. |

FOREIGN PATENT DOCUMENTS

| | | |
|---|---|---|
| CN | 102821449 A | 12/2012 |
| CN | 103391151 A | 11/2013 |
| CN | 103841644 A | 6/2014 |
| CN | 106455094 A | 2/2017 |
| CN | 107306177 A | 10/2017 |
| CN | 108111283 A | 6/2018 |
| CN | 108259143 A | 7/2018 |
| CN | 108631815 A | 10/2018 |
| CN | 109150429 A | 1/2019 |
| CN | 109314562 A | 2/2019 |
| CN | 109379172 A | 2/2019 |
| WO | 2019/047845 A1 | 3/2019 |

OTHER PUBLICATIONS

"Full TX Power UL Transmission," 3GPP TSG RAn WG1 Meeting #96bis, R1-1904015, Xi'an, China, Apr. 8-12, 2019, Source: ZTE, Agenda Item: 7.2.8.4.

"On full power UL transmission," 3GPP TSG RAN WG1 Meeting #96-bis, R1-1904847, Xi'an, China, Apr. 8-12, 2019, Source: Ericsson, Agenda Item: 7.2.8.4.

First Office Action for Indian Patent Application 202127050558 issued on Mar. 24, 2022 and its English Translation provided by Indian Patent Office.

Vivo, "Discussion on full TX power UL transmission", R1-1810404, 3GPP TSG RAN WG1 Meeting #94bis, Chengdu, China, Oct. 8-12, 2018, all pages.

Ericsson, "Maintenance for multi-antenna scheme", Tdoc R1-1811170, 3GPP TSG RAN WG1 Meeting #94bis, Chengdu, China, Oct. 8-12, 2018, all pages.

First Office Action and Search Report from CN app. No. 201910286796.4, dated Mar. 16, 2021, with English translation from Global Dossier, all pages.

International Search Report from PCT/CN2020/083974, dated Jul. 8, 2020, with English translation from WIPO, all pages.

Written Opinion of the International Searching Authority from PCT/CN2020/083974, dated Jul. 8, 2020, with English translation from WIPO, all pages.

International Preliminary Report on Patentability from PCT/CN2020/083974, dated Sep. 28, 2021, with English translation from WIPO, all pages.

* cited by examiner

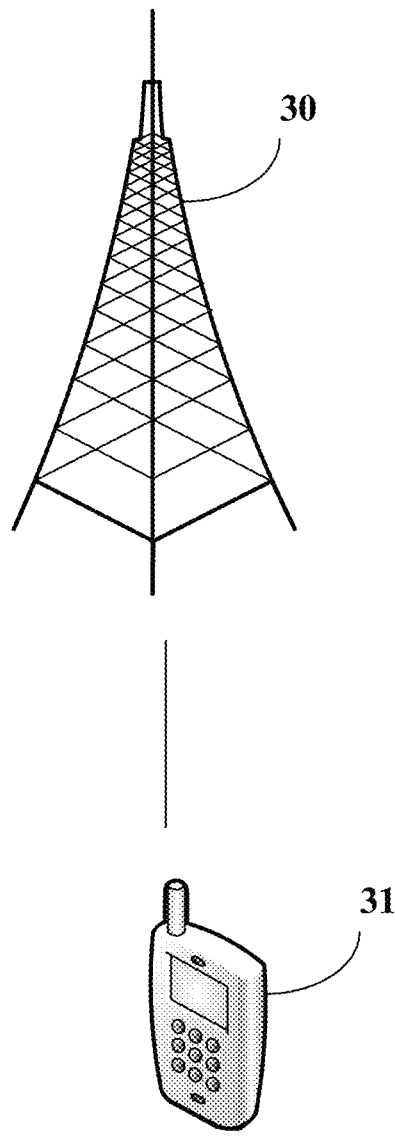

FIG. 3 sending a first signal and send a demodulation reference signal (DMRS) corresponding to the first signal to a second device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports

401

FIG. 4 detecting a first signal sent by a first device and DMRS corresponding to the first signal; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

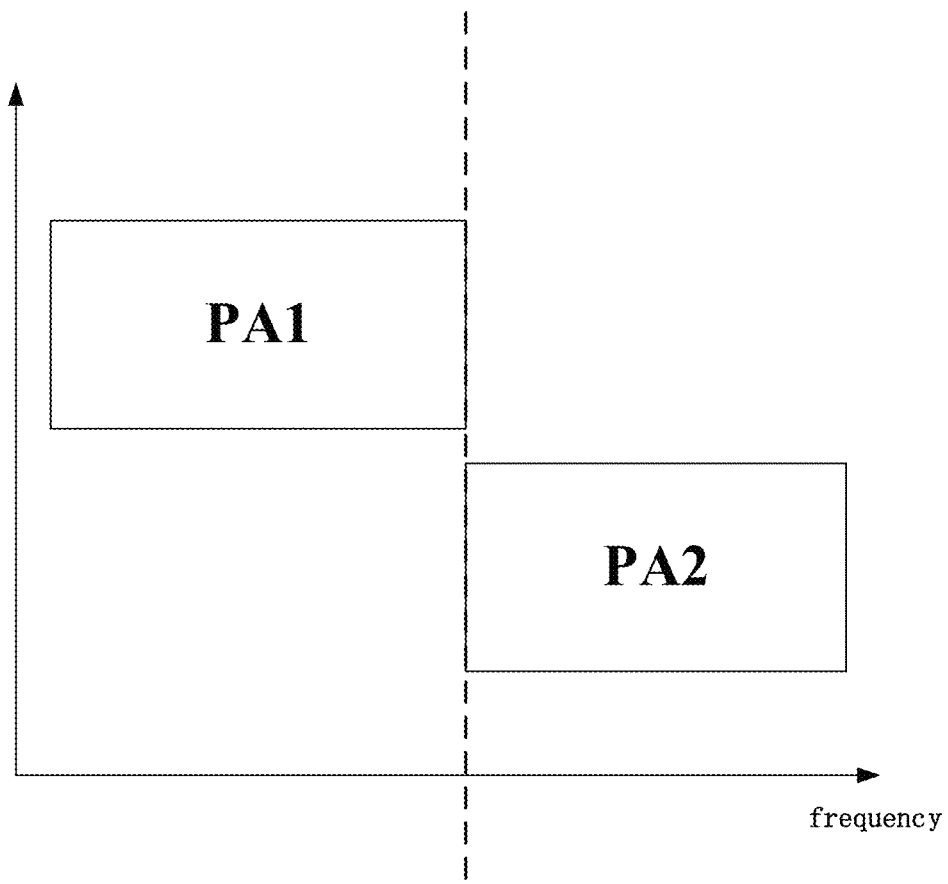

FIG. 6

DATA TRANSMISSION METHOD AND DEVICE

CROSS-REFERENCE TO RELATED APPLICATIONS

The present application is the U.S. national phase of PCT Application No. PCT/CN2020/083974 filed on Apr. 9, 2020, which claims a priority of the Chinese patent application No. 201910286796.4 filed on Apr. 10, 2019, the disclosures of which are incorporated herein by reference in their entireties.

TECHNICAL FIELD

The present disclosure relates to the field of communications technology, in particular to a data transmission method and device.

BACKGROUND

In a 3rd Generation Partnership Project (3GPP) New Radio interface (NR) system in the related art, when transmission is performed with a low rank (a rank of a transmission matrix of an antenna) under a codebook-based uplink transmission scheme configured with a plurality of antenna ports, transmission power of a terminal having a partially coherent transmission capability and a terminal having a noncoherent transmission capability cannot reach a maximum transmission power. This will degrade the performance of the terminal at the edge of a cell, the coverage of the cell is adversely affected.

SUMMARY

An object of the present disclosure is to provide a data transmission method and device, so as to solve the problem that the transmission power of the terminal cannot meet an actual requirements.

In one aspect, the present disclosure provides in some embodiments a data transmission method applied for a terminal, including: sending a first signal and a demodulation reference signal (DMRS) corresponding to the first signal to a second device; wherein the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

Optionally, different data streams in the first signal correspond to different DMRS ports.

Optionally, the sending a first signal to a second device includes: sending the first signal to the second device according to first transmission power; wherein the first transmission power is determined by evenly distributing transmission power of the first signal on all first signal ports corresponding to the transmission of the first signal.

Optionally, the method further includes: sending first information to the second device; wherein the first information indicates that the first device has a capability to send the first signal with the maximum transmission power; and/or wherein the first information indicates that the first device has a capability to map the same DMRS port to one or more of the following: different PAs, different SRS ports, different first signal ports in different subbands; the sending a first signal and a demodulation reference signal (DMRS) corresponding to the first signal to a second device includes: sending the first signal and the DMRS corresponding to the first signal to the second device according to the first information.

Optionally, the method further includes: receiving second information from the second device; the sending a first signal and a demodulation reference signal (DMRS) corresponding to the first signal to a second device includes: sending the first signal and the DMRS corresponding to the first signal to the second device according to the second information; wherein the second information indicates at least one of the following: a first power control strategy used by the first device; the first device sending the first signal with the maximum transmission power; the first device mapping a same DMRS port to one of more of different PAs, different SRS ports and/or different first signal ports in different subbands; the first device mapping a same data stream of the first signal to one of more of different PAs, different SRS ports and/or different first signal ports in different subbands; a first transmission mode used by the first device; a precoding matrix of the first signal being a codeword whose number of transmission streams is less than or equal to K, where K is an integer greater than or equal to 1; a number of transmission streams of the first signal being less than or equal to M, where M is an integer greater than or equal to 1; the precoding matrix of the first signal being a noncoherent codeword; the precoding matrix of the first signal being a partially coherent codeword; the precoding matrix of the first signal being the noncoherent codeword or the partially coherent codeword.

Optionally, the method further includes: receiving third information from the second device, the third information indicating correspondence between the DMRS port and the SRS port; or sending the third information to the second device, where the third information indicates the correspondence between the DMRS port and the SRS port.

Optionally, the method further includes: determining at least one of the following according to a first rule or according to signaling indicated by a network side: a precoding matrix used by the first signal and/or the DMRS port corresponding to the first signal in each subband in the frequency domain resource or the system bandwidth or the BWP where the first signal is scheduled; a PA used by the first signal and/or the DMRS port corresponding to the first signal in each subband in the frequency domain resource or the system bandwidth or the BWP where the first signal is scheduled; a SRS port corresponding to the first signal and/or the DMRS port corresponding to the first signal in each subband in the frequency domain resource or the system bandwidth or the BWP where the first signal is scheduled.

Optionally, the method further includes: sending signaling to the second device, the signaling indicating at least one of the following: a precoding matrix used by the first signal in each subband in the frequency domain resource or the system bandwidth or the BWP where the first signal is scheduled; a DMRS port corresponding to the first signal in each subband in the frequency domain resource or the system bandwidth or the BWP where the first signal is scheduled; a PA used by the first signal in each subband in the frequency domain resource or the system bandwidth or the BWP where the first signal is scheduled; a SRS port corresponding to the first signal in each subband in the frequency domain resource or the system bandwidth or the BWP where the first signal is scheduled; a PA used by the DMRS corresponding to the first signal in each subband in the frequency domain resource or the system bandwidth or the BWP where the first signal is scheduled; a SRS port corresponding to the DMRS port corresponding to the first signal in each subband in the frequency domain resource or the system bandwidth or the BWP where the first signal is scheduled.

Optionally, the signaling includes: a precoding matrix of one subband; or, a plurality of precoding matrices, wherein precoding matrices in the plurality of precoding matrices and subbands have a predefined correspondence relationship.

Optionally, the subband of the first signal is determined by at least one of the following: determining by division according to a quantity of subbands and resources allocated by the second device for the first signal, wherein the quantity of subbands is pre-agreed by the first device and the second device; determining according to subband division in a system bandwidth or the BWP of the first signal and scheduling information of the first signal; obtained by division of the resources allocated for the first signal.

Optionally, the system bandwidth or BWP of the first signal or the subband in the scheduled resource of the first signal is determined according to a predefined subband division mode.

Optionally, the predefined subband division mode includes: the system bandwidth or BWP of the first signal or the scheduled resource of the first signal includes S subbands, and a minimum unit of each subband is P consecutive PRBs, in one subband, the minimum unit appears every P*S PRBs, wherein the P is an integer greater than or equal to 1, the S is a positive integer, and the S is configured by the network side or agreed by a protocol.

Optionally, the predefined subband division mode includes at least one of the following: one or more DMRS ports corresponding to one subband; one DMRS port corresponding to one or more subbands.

Optionally, different DMRS ports are only transmitted on different subbands in the frequency domain resource, the system bandwidth, or the BWP where the first signal is scheduled.

Optionally, a position offset of the subband in the frequency domain resource, the system bandwidth, or the BWP where the first signal corresponding to the DMRS port is scheduled is configured by the network side or agreed in a protocol.

Optionally, the method further includes: sending DMRS resource indication information to the second device, wherein the DMRS resource indication information indicates a frequency domain resource location of the DMRS port; and/or sending subband resource indication information to the second device, wherein the subband resource indication information indicates a frequency domain resource location of the subband.

Optionally, the method further includes: receiving resource indication information of the first signal from the second device; determining a physical resource block (PRB) to which the DMRS is mapped according to the resource indication information of the first signal and precoding of the first signal.

Optionally, one DMRS port is mapped on a PRB with data stream transmission corresponding to the DMRS port.

Optionally, the method further includes: receiving DMRS resource indication information and/or subband resource indication information sent by the second device, wherein the DMRS resource indication information indicates a frequency domain resource location of the DMRS port, the subband resource indication information indicates a frequency domain resource location of the subband; determining the frequency domain resource location of the DMRS corresponding to the first signal according to the DMRS resource indication information and the subband resource indication information.

Optionally, the sending a first signal to the second device includes: sending the first signal to the second device through a first transmission mode, wherein the first transmission mode includes at least one of the following: each data stream of the first signal being transmitted on all PRBs of the transmission resource indicated by the second device for the first device; each data stream of the first signal being only transmitted on a PRB where the DMRS port corresponding to the data stream is located.

Optionally, the method further includes: receiving resource indication information of the first signal from the second device; determining the transmission resource of the first signal according to the resource indication information; wherein, the resource indication information indicates at least one of the following: a resource allocation situation of the first signal in an entire bandwidth or BWP; a resource allocation situation of the first signal in a predefined subband; a resource allocation situation of the first signal in one or more subbands.

Optionally, the resource allocation mode of the SRS port includes any one of the following: resource allocation of the SRS port being irrelevant to mapping between the DMRS port and the SRS port; the SRS port being only mapped on a part of subband.

Optionally, the first signal performs rate matching based on an actual transmission condition of the DMRS port; and/or the first signal performs rate matching based on an assumption that a DMRS port with data stream mapping exists in each PRB.

Optionally, the first signal is an uplink signal, the first device is a terminal, and the second device is a network device; or the first signal is a downlink signal, and the first device is the network device, and the second device is the terminal.

In a second aspect, a data transmission method applied to a second device, includes: detecting a first signal and DMRS corresponding to the first signal sent by a first device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

Optionally, the method further includes: separately performing channel estimation on the same DMRS port and/or the first signal in different subbands.

Optionally, the method further includes: dividing scheduled bandwidth of the first signal into N subbands when scheduling the first signal, and calculating signal to interference and noise ratios of different subbands based on different SRS ports and/or different precoding matrices, N is an integer greater than 1.

Optionally, before detecting a first signal and a DMRS corresponding to the first signal sent by a first device; the method further includes: receiving fourth information from the first device, wherein the fourth information indicates at least one of the following: a coherent transmission capability of the first device; a capability of the first device to transmit the first signal with the maximum transmission power, wherein the first device has a capability to map the same DMRS port to different PAs, different SRS ports, and/or different first signal ports in different subbands; the first device has a capability to map the same data stream of the first signal to one of more of the following: different PAs, different SRS ports, and/or different first signal ports in different subbands.

Optionally, the method further includes: receiving first information from the first device, the first information indicating that the first device has the capability to transmit the first signal with maximum transmission power; and/or the first device has a capability to map the same DMRS port to one or more of the following in different subbands: different PAs, different SRS ports, and different first signal ports.

Optionally, the method further includes: sending second information to the first device, wherein the second information indicates at least one of the following: a first power control strategy used by the first device; the first device sending the first signal and the DMRS corresponding to the first signal with the maximum transmission power; a first device mapping a same DMRS port to one or more of different PA, different SRS ports and/or different first signal ports in different subbands; the first device mapping a same data stream of the first signal to one of more of different PAs, different SRS ports and/or different first signal ports in different subbands; a first transmission mode used by the first device; a precoding matrix of the first signal being a codeword whose number of transmission streams is less than or equal to K, where K is an integer greater than or equal to 1; a number of transmission streams of the first signal being less than or equal to M, where M is an integer greater than or equal to 1; the precoding matrix of the first signal being a non-coherent codeword; the precoding matrix of the first signal being a partially coherent codeword; the precoding matrix of the first signal being the non-coherent codeword or the partially coherent codeword.

Optionally, the method further includes: sending third information to the first device, the third information indicating correspondence between the DMRS port and the SRS port.

Optionally, the method further includes: sending signaling to the first device, and the signaling is used by the first device to determine at least one of the following: a precoding matrix used by the first signal and/or the DMRS port corresponding to the first signal in each subband in the frequency domain resource or the system bandwidth or the BWP where the first signal is scheduled; a PA used by the first signal and/or the DMRS port corresponding to the first signal in each subband in the frequency domain resource or the system bandwidth or the BWP where the first signal is scheduled; a SRS port corresponding to the first signal and/or the DMRS port corresponding to the first signal in each subband in the frequency domain resource or the system bandwidth or the BWP where the first signal is scheduled.

Optionally, the method further includes: receiving signaling from the first device, the signaling indicating at least one of the following: a precoding matrix used by the first signal in each subband in the frequency domain resource or the system bandwidth or the BWP where the first signal is scheduled; a DMRS port corresponding to the first signal in each subband in the frequency domain resource or the system bandwidth or the BWP where the first signal is scheduled; a PA used by the first signal in each subband in the frequency domain resource or the system bandwidth or the BWP where the first signal is scheduled; a SRS port corresponding to the first signal in each subband in the frequency domain resource or the system bandwidth or the BWP where the first signal is scheduled; a PA used by the DMRS corresponding to the first signal in each subband in the frequency domain resource or the system bandwidth or the BWP where the first signal is scheduled; a SRS port corresponding to the DMRS port corresponding to the first signal in each subband in the frequency domain resource or the system bandwidth or the BWP where the first signal is scheduled.

Optionally, the signaling includes: a precoding matrix for one subband; or a plurality of precoding matrices, where precoding matrices in the plurality of precoding matrices and subbands have a predefined correspondence relationship.

Optionally, the subband of the first signal is determined by at least one of the following: determining by division according to a quantity of subbands and resources allocated by the second device for the first signal, wherein the quantity of subbands is pre-agreed by the first device and the second device; determining according to subband division in a system bandwidth or the BWP of the first signal and scheduling information of the first signal; obtained by division of the resources allocated for the first signal.

Optionally, the subband in the system bandwidth or bandwidth portion of the first signal or in the scheduled resource of the first signal is determined according to a predefined subband division mode.

Optionally, the predefined subband division mode includes: the system bandwidth or BWP of the first signal or the scheduled resource of the first signal includes S subbands, and a minimum unit of each subband is P consecutive PRBs, in one subband, the minimum unit appears every P*S PRBs, wherein the P is an integer greater than or equal to 1, the S is a positive integer, and the S is configured by the network side or agreed by a protocol.

Optionally, the predefined subband division mode includes at least one of the following: one or more DMRS ports corresponding to one subband; one DMRS port corresponding to one or more subbands.

Optionally, the method further includes: determining a position offset of the subband in the frequency domain resource or the system bandwidth or the BWP in which the first signal is scheduled according to instruction information of the first device or a protocol agreement.

Optionally, the method further includes: sending resource indication information to the first device; wherein the resource indication information indicates at least one of: a resource allocation situation of the first signal in an entire bandwidth or BWP; a resource allocation situation of the first signal in a predefined subband; a resource allocation situation of the first signal in one or more subbands.

Optionally, the method further includes: determining a PRB to which the DMRS is mapped according to the resource indication information of the first signal sent by the first device and precoding of the first signal.

Optionally, the method further includes: sending DMRS resource indication information and/or subband resource indication information to the first device, wherein the DMRS resource indication information indicates a frequency domain resource location of the DMRS port, the subband resource indication information indicates a frequency domain resource location of the subband.

Optionally, the resource allocation mode of the SRS port includes at least one of the following: resource allocation of the SRS port is irrelevant to mapping between the DMRS port and the SRS port; the SRS port is only mapped on a part of bandwidth allocated by the second device for the SRS port.

Optionally, the detecting the first signal sent by the first device includes: detecting the first signal sent by the first device on all PRBs of the transmission resources indicated by the second device for the first device; or detecting the first signal sent by the first device on all PRBs of the transmission resources indicated by the first device for the second device; or, detecting the first signal sent by the first device on a PRB where the DMRS port corresponding to each data stream of the first signal is located.

Optionally, the first signal is an uplink signal, the first device is a terminal, and the second device is a network device; or, the first signal is a downlink signal, and the first device is the network device, and the second device is the terminal.

In a third aspect, a first device, includes: a first sending module, configured to send a first signal and a DMRS corresponding to the first signal to a second device, wherein the first signal includes at least one data stream, and each data stream corresponds to one DMRS port, one DMRS port corresponds to one or more of the following in different subbands: different power amplifiers (PAs), different sounding reference signal (SRS) ports, or different first signal ports, the first signal port is used to transmit the first signal.

In a fourth aspect, a first device includes a first transceiver and a first processor, wherein the first transceiver sends a first signal and a DMRS corresponding to the first signal to a second device, wherein the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

In a fifth aspect, a second device includes a detection module, configured to detect a first signal and a DMRS corresponding to the first signal sent by a first device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports. In a sixth aspect, a second device includes: a second transceiver and a second processor, wherein the second processor is configured to detect a first signal and a DMRS corresponding to the first signal sent by a first device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports. In a seventh aspect, a communication device includes a processor, a memory, and a program stored on the memory and executed by the processor, the program being executed by the processor to implement the steps of the data transmission method.

In an eighth aspect, a computer-readable storage medium on which a computer program is stored, and the computer program is executed by a processor to implement the steps of the data transmission method.

In the embodiments of the present disclosure, the transmission power of the terminal may efficiently adjusted and the performance of the terminal and the system are improved.

BRIEF DESCRIPTION OF THE DRAWINGS

Various additional advantages and benefits will become apparent to those of ordinary skill in the art upon reading the following detailed description of the embodiments. The drawings are only for purposes of illustrating the embodiments and are not to be construed as limiting the disclosure. Also, like reference numerals are used to refer to like parts throughout the drawings. In the drawings:

FIG. 3 is an architectural diagram of a wireless communication system according to an embodiment of the present disclosure;

FIG. 4 is a flowchart of a data transmission method according to an embodiment of the disclosure;

FIG. 5 is another flowchart of a data transmission method according to an embodiment of the disclosure;

FIG. 6 is a schematic diagram of a centralized subband according to an embodiment of the present disclosure;

DETAILED DESCRIPTION

Figure 1:
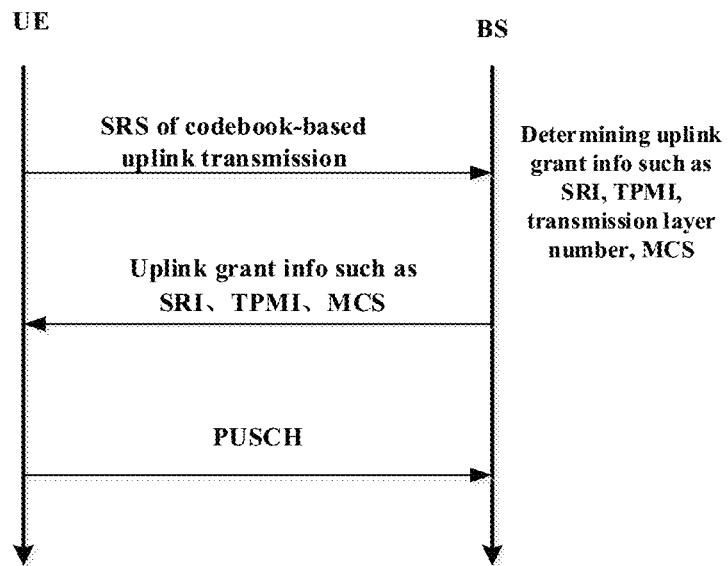
FIG. 1 is a schematic diagram of codebook-based uplink transmission.

The technical solutions in the embodiments of the present disclosure will be clearly and completely described below in conjunction with the accompanying drawings of the present disclosure. Obviously, the described embodiments are a part of the embodiments of the present disclosure, but not all of the embodiments. Based on the embodiments in the present disclosure, all other embodiments obtained by those of ordinary skill in the art without creative work shall fall within the protection scope of the present disclosure.

Such terms as "include" or "comprise" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" is merely used to describe the relationship between objects, and it may include three situations. For example, "A and/or B" may represent that, there is only A, there are both A and B, and there is only B. For example, A and/or B and/or C means A only, B only, C only, A and B, A and C, B and C, A and B and C.

In the embodiments of the present disclosure, words such as "exemplary" or "for example" are used to represent examples or illustrations. Any embodiment or solution described as "exemplary" or "for example" in the embodiments of the present disclosure should not be construed as being more preferable or advantageous than other embodiments or solutions. To be precise, words such as "exemplary" or "for example" are used to present related concepts in a specific manner.

The technology described in the present disclosure is not limited to New Radio (New Radio) systems, Long Time Evolution (LTE)/LTE-Advanced (LTE-A) systems, and can also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) systems and other systems.

The terms "system" and "network" are often used interchangeably. The CDMA system can implement radio technologies such as CDMA2000 and Universal Terrestrial Radio Access (UTRA). UTRA includes Wideband Code Division Multiple Access (WCDMA) and other CDMA variants. The TDMA system can implement radio technologies such as the Global System for Mobile Communication (GSM). OFDMA system can realize radio technologies such as ultra mobile broadband (UMB), evolved UTRA (E-UTRA), IEEE 802.11 (Wi-Fi), IEEE 802.16 (WiMAX), IEEE 802. 20, Flash-OFDM. UTRA and E-UTRA are part of Universal Mobile Telecommunications System (UMTS). LTE and advanced LTE (such as LTE-A) are new UMTS versions that use E-UTRA. UTRA, E-UTRA, UMTS, LTE, LTE-A, and GSM are described in documents from an organization named 3rd Generation Partnership Project (3GPP). CDMA2000 and UMB are described in documents from an organization named "3rd Generation Partnership Project 2" (3GPP2). The techniques described in the present disclosure can be used for the systems and radio technologies mentioned above, as well as other systems and radio technologies.

In the embodiments of the present disclosure, the form of the access network is not limited, and may include Macro Base Station, Pico Base Station, Node B (the name of 3G mobile base station), enhanced base station (eNB), Home enhanced base station (Femto eNB or Home eNode B or Home eNB or HeNB), relay station, access point, remote radio unit (RRU), remote radio head (RRH), etc. The base station can be a base station of 5G and later versions (for example: gNB, 5G NR NB, etc.), or a base station in other communication systems (for example: eNB, WLAN access point, or other access points, etc.), where the base station can be known as Node B, Evolved Node B, Access Point, Base Transceiver Station (BTS), Radio Base Station, Radio Transceiver, Basic Service Set (BSS), Extended Service Set (ESS), Home Node B, Home Evolved Node B, WLAN Access Point, WiFi Node or some other appropriate term in the art, as long as the same technical effect is achieved, the base station is not limited to a specific technical term. It should be noted that in the embodiments of the present disclosure, only the base station in the NR system is taken as an example, but the specific type of the base station is not limited. User Equipment (UE) can be a mobile phone (or cell phone), or other equipment capable of sending or receiving wireless signals, including user equipment, personal digital assistants (PDA), wireless modems, wireless communication devices, handheld devices, and laptops. PCs, cordless phones, wireless local loop (WLL) stations, Customer Premise Equipment (CPE) capable of converting mobile signals into WiFi signals, or mobile smart hotspots, smart home appliances, or other devices that spontaneously communicate with mobile communication networks without human operations.

In order to facilitate the understanding of the embodiments of the present disclosure, the following technical points are first introduced:

The Physical Uplink Shared CHannel (PUSCH) of the 3 GPP NR system supports two uplink transmission schemes: codebook-based transmission and non-codebook transmission.

(1) The basic principle of the codebook-based uplink transmission scheme.

The codebook-based uplink transmission scheme is a multi-antenna transmission technology that determines the uplink transmission precoding matrix based on a fixed codebook. In the NR system, the codebook-based uplink transmission scheme is similar to the basic principle of the uplink spatial multiplexing technology in the LTE system, but the codebook and precoding indication methods are different. For codebook-based uplink transmission, a terminal (UE) is configured with one or two sounding reference signal (SRS) resources for uplink channel estimation and measurement. Each SRS resource can include N antenna ports (N is greater than or equal to 1). The base station determines the transmission precoding matrix indicator (TPMI) corresponding to the PUSCH transmission by measuring the SRS, and instructs the same to the UE. TPMI is used to indicate one precoding matrix in the N-antenna codebook. As shown in FIG. 1, the flow chart of the codebook-based uplink transmission scheme in the NR system includes the following steps.

Step 1: The UE sends an SRS obtained based on channel state information (CSI) of an uplink transmission scheme of a codebook to the base station.

Step 2: The base station performs uplink channel detection according to the SRS sent by the UE, performs resource scheduling for the UE, and determines the SRS resource corresponding to the uplink transmission, the layer number of uplink transmission and the precoding matrix, and the base station further determines the Modulation and Coding Scheme (MC S) level of uplink transmission according to the precoding matrix and channel information, and then the base station notifies the UE of the resource allocation of PUSCH and the corresponding MCS, TPMI, layer number of transmission and corresponding SRS resource indicator (SRI).

Step 3: The UE modulates and encodes the data according to the MCS indicated by the base station, and determines the precoding matrix and the layer number of transmission used during sending data by using the indicated SRI, TPMI, and layer number of transmission, and then precodes and sends the data. The PUSCH demodulation reference signal (DMRS) and the PUSCH data adopt the same precoding method, that is, one PUSCH data stream corresponds to one DMRS port.

Step 4: The base station estimates the uplink channel based on the demodulated pilot signal and performs data detection.

One UE may have a plurality of power amplifiers (PA), and coherent transmission or noncoherent transmission may be possible between different PAs. When the PAs corresponding to the two antenna ports meet the coherence condition, the UE can perform data transmission of the same layer at the same time by using the two antenna ports through precoding, to obtain the array gain. For UEs that cannot achieve antenna coherent transmission, there may be a large difference between the phase difference between the antennas of UEs when the base station calculates the TPMI and the phase difference between the antennas of UEs when the UE receives the TPMI for PUSCH transmission. If the TPMI indicates that antennas that cannot perform coherent transmission are used for the same layer of data transmission. The optimal uplink transmission precoding for the UE may not be the precoding indicated by TPMI, that is, the terminal cannot obtain better performance when using the precoding indicated by the base station through TPMI for PUSCH transmission.

The NR system defines three types of antenna coherent transmission capabilities of the UE:
(1) Full Coherent: All antennas can perform coherent transmission;
(2) Partial Coherent: Antennas in the same coherent transmission group can perform coherent transmission, antennas between different coherent transmission groups cannot perform coherent transmission;
(3) NonCoherent: No antenna can perform coherent transmission.

The base station may send codebook subset restriction signaling to the UE based on the antenna coherent transmission capability of UE to restrict the UE from using part of the codewords for uplink transmission. For UEs whose coherent transmission capability is "full Coherent", the base station can configure a codebook subset restriction corresponding to "fullyAndPartialAndNonCoherent" or "partialAndNonCoherent" or "nonCoherent" through Radio Resource Control (RRC) signaling; for UEs whose coherent transmission capability is "partialCoherent", the base station can configure the codebook subset restriction corresponding to "partialAndNonCoherent" or "nonCoherent" through RRC signaling; for UEs whose coherent transmission capability is "NonCoherent", the base station can configure the codebook subset restriction corresponding to "NonCoherent" through RRC signaling. Among them, a codebook corresponding the codebook subset restriction of "nonCoherent" only includes noncoherent codewords; a codebook corresponding the codebook subset restriction of "partialAndNonCoherent" includes noncoherent and partially coherent codewords; a codebook corresponding the codebook subset restriction of "fullyAndPartialAndNonCoherent" includes noncoherent codewords, partially coherent codewords, and fully coherent codewords.

One noncoherent codeword satisfies the following conditions: each PUSCH layer has only one active antenna port (each layer in the codeword has non-zero element only corresponding to one antenna port).

One partially coherent codeword satisfies the following conditions: each PUSCH layer has at most two active antenna ports (each layer in the codeword has non-zero elements corresponding to at most two antenna ports), and there is at least one PUSCH layer having two active antenna ports.

A fully coherent codeword satisfies the following conditions: at least one PUSCH layer uses all antenna ports (there is at least one layer in the codeword that elements corresponding to all antenna ports are non-zero).

In other words, any column in the codeword of partially coherent transmission only has non-zero elements belonging to the same coherent transmission antenna group (in the 3GPP NR system, the first and third antennas belong to a coherent transmission antenna group, and the second and fourth antennas belong to another coherent transmission antenna group); any column in the codeword of noncoherent transmission has only non-zero elements corresponding to one antenna; all elements in at least one column of the codeword of the fully coherent transmission are non-zero.

For ease of understanding, the following lists the uplink codebooks in the 3GPP NR system Rel-15, and gives the specific codeword types corresponding to the above definitions.

TABLE 1

Precoding matrix W for single-layer transmission using two antenna ports. Among them, codewords with a TPMI index of 0 to 1 are codewords for noncoherent transmission; other codewords are codewords for fully coherent transmission.

| TPMI (index) | W (ordered from left to right in increasing order of TPMI index) |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$ — — |

TABLE 2

Precoding matrix W for single-layer transmission using four antenna ports with transform precoding enabled under the DFT-S-OFDM waveform. Among them, codewords with a TPMI index of 0 to 3 are codewords for noncoherent transmission; codewords with a TPMI index of 4 to 11 are codewords for partially coherent transmission; and other codewords are codewords for fully coherent transmission.

| TPMI index | W (ordered from left to right in increasing order of TPMI index) |
|---|---|
| 0-7 | $\frac{1}{2}\begin{bmatrix}1\\0\\0\\0\end{bmatrix}$  $\frac{1}{2}\begin{bmatrix}0\\1\\0\\0\end{bmatrix}$  $\frac{1}{2}\begin{bmatrix}0\\0\\1\\0\end{bmatrix}$  $\frac{1}{2}\begin{bmatrix}0\\0\\0\\1\end{bmatrix}$  $\frac{1}{2}\begin{bmatrix}1\\0\\1\\0\end{bmatrix}$  $\frac{1}{2}\begin{bmatrix}1\\0\\-1\\0\end{bmatrix}$  $\frac{1}{2}\begin{bmatrix}1\\0\\j\\0\end{bmatrix}$  $\frac{1}{2}\begin{bmatrix}1\\0\\-j\\0\end{bmatrix}$ |

TABLE 2-continued

Precoding matrix W for single-layer transmission using four antenna ports with transform precoding enabled under the DFT-S-OFDM waveform. Among them, codewords with a TPMI index of 0 to 3 are codewords for noncoherent transmission; codewords with a TPMI index of 4 to 11 are codewords for partially coherent transmission; and other codewords are codewords for fully coherent transmission.

| TPMI index | W (ordered from left to right in increasing order of TPMI index) |
|---|---|
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\1\end{bmatrix}$ $\frac{1}{2}\begin{bmatrix}1\\j\\-j\\-j\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 3

Precoding matrix W for single-layer transmission using four antenna ports with transform precoding disabled under CP-OFDM waveform. Among them, codewords with a TPMI index of 0 to 3 are codewords for noncoherent transmission; codewords with a TPMI index of 4 to 11 are codewords for partially coherent transmission; and other codewords are codewords for fully coherent transmission.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\1\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 4

Precoding matrix W for two-layer transmission using two antenna ports with transform precoding disabled under CP-OFDM waveform. Among them, a codeword with a TPMI index of 0 is a codeword for noncoherent transmission; a codeword with a TPMI index of 1 to 2 is a codeword for fully coherent transmission.

| TPMI index | W (ordered from left to right in increasing order of TPMI index) | | |
|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

TABLE 5

Precoding matrix W for two-layer transmission using four antenna ports with transform precoding disabled under the CP-OFDM waveform. Among them, codewords with a TPMI index of 0 to 5 are codewords for noncoherent transmission; codewords with a TPMI index of 6 to 13 are codewords for partially coherent transmission; other codewords are codewords for fully coherent transmission.

| TPMI index | W (ordered from left to right in increasing order of TPMI index) | | | |
|---|---|---|---|---|
| 0-3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ | $\frac{1}{2\sqrt{2}}\begin{bmatrix}1 & 1\\j & j\\j & -j\\-1 & 1\end{bmatrix}$ | $\frac{1}{2\sqrt{2}}\begin{bmatrix}1 & 1\\-1 & -1\\1 & -1\\-1 & 1\end{bmatrix}$ | $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ | $\frac{1}{2\sqrt{2}}\begin{bmatrix}1 & 1\\-j & -j\\j & -j\\1 & -1\end{bmatrix}$ | — | — |

TABLE 6

Precoding matrix W for three-layer transmission using four antenna ports with transform precoding disabled under CP-OFDM waveform. Among them, codewords with a TPMI index of 0 are codewords for noncoherent transmission; codewords with a TPMI index of 1 to 2 are codewords for partially coherent transmission; other codewords are codewords for fully coherent transmission.

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

TABLE 7

Precodng matrix W for four-layer transmission using four antenna ports with transform precoding disabled under the CP-OFDM waveform. Among them, codewords with a TPMI index of 0 are codewords for noncoherent transmission; codewords with a TPMI index of 1 to 2 are codewords for partially coherent transmission; other codewords are codewords for fully coherent transmission.

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

2) The PA structure of the UE.

A UE with a specific power class (PC) capability needs to meet a maximum transmitting power requirement. For example, for a UE with a power level of PC3, its maximum transmitting power needs to reach 23 dBm; for a UE with a power level of PC2, its maximum transmitting power needs to reach 26 dBm. For a UE with a plurality of PAs, it can achieve the maximum transmitting power requirement by using the plurality of PAs to transmit at the same time. That is, it is not required that each PA of the UE can reach the maximum transmitting power required by the power level of the UE.

For example, for a UE with two transmitting antennas (or two PAs), each transmitting antenna (or PA) can reach 20 dBm, and the UE can transmit up to 23 dBm at the same time through two antennas, then the UE is a UE with a power level of PC3.

(3) Uplink multiple-input multiple-output (MIMO) power control.

In the NR system, the multi-antenna power allocation method of the PUSCH using uplink MIMO is as follows. The UE performs power scaling on the proportion in the maximum number of SRS ports in one SRS resource supported by the terminal according to the transmission power (in the NR system, corresponding to $P_{PUSCH,b,f,c}(i,j,q_d,l)$ section 7.7.1 in TS 38.213-f40) calculated by the uplink power control formula according to the actual number of ports that actually send signals, then the scaled power is distributed equally on the antenna ports that actually send the signals.

For example, suppose the maximum number of SRS ports in one SRS resource supported by the terminal is 4, the uplink transmission is configured with 4 antenna ports, the precoding matrix indicated by the base station is $$\frac{1}{2}\begin{bmatrix}1\\0\\1\\0\end{bmatrix},$$

and the transmission power calculated by the UE according to the PUSCH power control formula is P, the actual transmission power of PUSCH is P/2, and the transmission power of the first antenna port and the third antenna port are each P/4. This scaling does not require that each antenna port of the UE can reach the maximum transmission power, thereby allowing the UE to use lower-cost radio frequency components to implement a plurality of antenna functions.

According to the above power control scheme, when the TPMI indicated by the base station for the UE is a noncoherent codeword or a partially coherent codeword, the UE cannot transmit at full power.

From the perspective of UE performance, when the UE is located at the edge of the cell or the channel conditions are poor, the base station usually configures the UE with a low-rank transmission (low-rank transmission refers to the transmission with a lower quantities of streams), and the data is transmitted with the maximum transmission power (or maximum output power) as much as possible. Under the codebook design of the NR system, for codebook-based uplink transmission, UEs with partial antenna coherent transmission capabilities and noncoherent transmission capabilities always have some antenna ports without PUSCH transmission during low-rank transmission. Therefore, the current uplink MIMO multi-antenna power allocation mechanism cannot guarantee that a UE with partial antenna coherent transmission capability and noncoherent transmission capability under the codebook-based uplink transmission scheme can reach the maximum transmission power during low-rank transmission, thereby reducing the performance of UE at the edge of the cell and affecting the coverage of the cell.

Under the current uplink transmission scheme and power control scheme, when the TPMI indicated by the base station for the UE is a non-coherent codeword or a partially coherent codeword, the UE cannot use the maximum transmission power to transmit an uplink signal.

For UEs with the partial coherent transmission capability and UEs with the non-coherent transmission capability, the base station cannot indicate fully coherent codewords for the UE. Therefore, during low-rank transmission in a codebook-based uplink transmission scheme with multiple antenna ports, the terminal cannot transmit data with the maximum transmission power. This will reduce the use efficiency of the transmission power of UE and affect the performance of the UE during low-rank transmission.

In order to enable the UE to implement full power transmission, the simplest way is for the UE to use a better PA. For example, each PA can reach the maximum transmission power, or some PAs can reach the maximum transmission power, and then the power control criterion is changed to allow the UE to use the maximum transmission power to transmit uplink signals when using part of the PA, but this will increase the cost of the UE.

Figure 2:
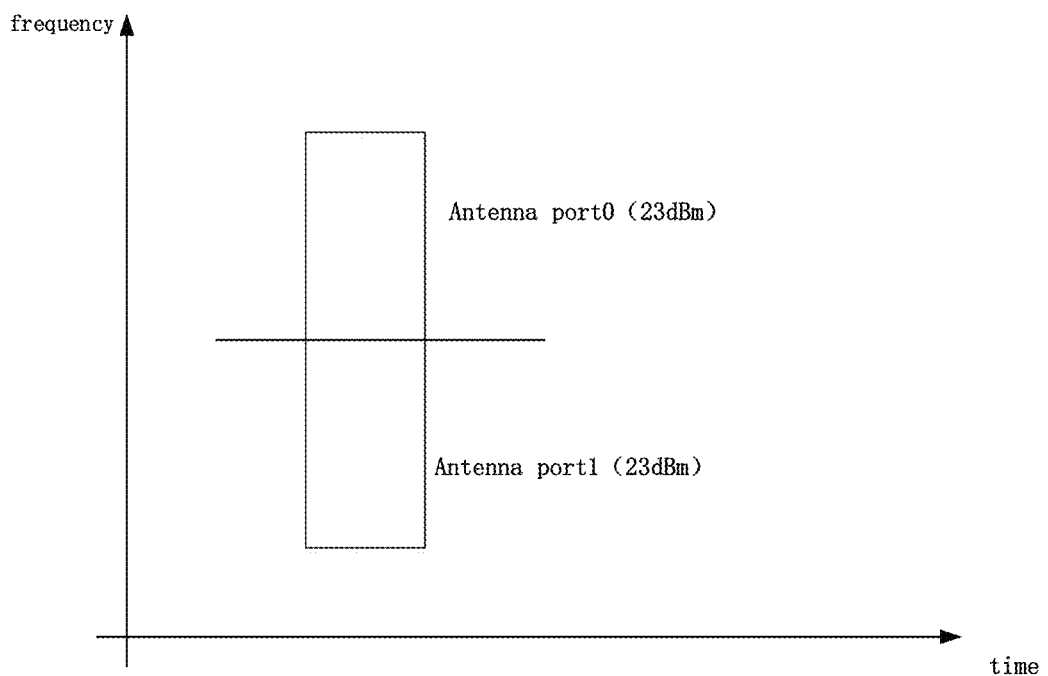
FIG. 2 is a schematic diagram of transmission power of the antenna port 1 and the antenna port 2.

In the case that it is not required that each PA of the UE meets the maximum transmission power requirement, the UE uses different antenna port to send data in different bandwidths, so that the total output power reaches the maximum transmission power requirement. For example, if the UE uses one antenna port in half of the bandwidth to send data at 23 dBm, and another antenna port in the other half of the bandwidth to send data at 23 dBm, the total transmission power can reach 26 dBm. As shown in FIG. 2, related technologies cannot support this transmission scheme.

The embodiments of the present disclosure are described below in conjunction with the drawings. The data transmission method and device provided by the embodiments of the present disclosure can be applied to a wireless communication system. The wireless communication system may be a 5G system, or an evolved long term evolution (eLTE) system, or a subsequent evolved communication system.

FIG. 3 is a schematic diagram of the architecture of a wireless communication system provided by an embodiment of the present disclosure. As shown in FIG. 3, the wireless communication system may include: a network device 30 and a terminal (for example, UE). For example, the terminal is denoted as UE31, and UE31 may communicate with the network device 20 (transmitting signaling or transmitting data). In practical applications, the connection between the above-mentioned various devices may be a wireless connection. In order to conveniently and intuitively indicate the connection relationship between the various devices, a solid line is used as shown in FIG. 3.

It should be noted that the foregoing communication system may include a plurality of UEs 31, and the network device 30 may communicate with the plurality of UEs 31.

The network device 30 provided by the embodiment of the present disclosure may be a base station, which may be a commonly used base station, an evolved node base station (eNB), or a network device in a 5G system (for example, the a next generation node base station (gNB) or a transmission and reception point (TRP)).

The UE provided in the embodiments of the present disclosure may be a mobile phone, a tablet computer, a notebook computer, an Ultra-Mobile Personal Computer (UMPC), a netbook, or a Personal Digital Assistant (PDA), etc.

Referring to FIG. 4, an embodiment of the present disclosure provides a data transmission method. The execution subject of the method may be a first device, and includes step 401. The specific steps are as follows.

Step 401: sending a first signal and send a demodulation reference signal (DMRS) corresponding to the first signal to a second device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

It can be understood that the subband may be a subband of the scheduled bandwidth of the first signal, or may also be a subband obtained by dividing the entire bandwidth.

In the embodiment of the present disclosure, optionally, the first signal may be an uplink signal, the first device is a terminal, and the second device is a network device; or, the first signal may also be a downlink signal, the first device is the network device, and the second device is the terminal. Optionally, the first signal is PUSCH, and the first signal port is a PUSCH port.

Optionally, the first signal is a Physical Uplink control CHannel (PUCCH), and the first signal port is a PUCCH port.

Optionally, the first signal is a Physical Downlink Shared CHannel, (PDSCH), and the first signal port is a PDSCH port.

Optionally, the first signal is a Physical Downlink control CHannel, (PDCCH), and the first signal port is a PDCCH port.

Optionally, different DMRS ports correspond to different reference signal ports used for acquisition of channel state information (CSI) of the first signal. For example, when the first signal is PUSCH, the reference signal used for acquisition of the CSI of the first signal is SRS, and different DMRS ports corresponding to the PUSCH correspond to different SRS ports. For another example, when the first signal is the PDSCH, the reference signal used for acquisition of the CSI of the first signal is CSI-RS, and different DMRS ports corresponding to the PDSCH correspond to different CSI-RS ports.

A subband can be a subband defined in the protocol, or one or more PRBs that are divided according to a certain rule and meet certain same conditions. For example, it may be one or more PRBs using the same precoding matrix. For another example, it may be one or more PRBs that use the same PA, it can be one or more PRBs corresponding to the same SRS port, it can be one or more PRBs corresponding to the same first signal port, etc.

Some possible definitions of subbands are that: frequency domain resources with the same precoding matrix belong to the same subband, frequency domain resources with different precoding matrices belong to different subbands; frequency domain resources of the same data stream mapping to the same SRS port belong to the same subband; frequency domain resources of the same data stream mapping to different SRS ports belong to different subbands; PRBs that transmit the same DMRS port belong to the same subband, and PRBs that transmit different DMRSs belong to different subbands; PRBs that transmit the same SRS port belong to the same subband, and PRBs that transmit different SRSs belong to different subbands; PRBs that use the same PA on the same DMRS port belong to the same subband; PRBs that use different PAs on the same DMRS port belong to different subbands; PRBs mapping to the same SRS on the same DMRS port belong to the same subband; PRBs mapping to the different SRSs on the same DMRS port belong to different subbands; and so on.

Optionally, the subband is defined per data stream. That is, there are different sub-band divisions for different data streams.

Optionally, the subbands is defined per UE. That is, there are different sub-band divisions for the first signals of different users.

In the embodiment of the present disclosure, optionally, different data streams in the first signal correspond to different DMRS ports.

In the embodiment of the present disclosure, optionally, the sending the first signal to the second device includes: sending the first signal to the second device according to the first transmission power.

Wherein, the first transmission power is determined by evenly distributing the transmission power of the first signal on all first signal ports corresponding to the transmission of the first signal. For example, in PUSCH, $P_{PUSCH,b,f,c}$ (i,f,$q_d$, l) is used for calculation according to the formula in section 7.1.1 of TS38.213 in the current 3GPP NR system.

In the embodiment of the present disclosure, optionally, before step 401, the method may further include: sending first information to the second device; the first information indicates that the first device has a capability to send the first signal with the maximum transmission power;

The first device has the capability to map the same DMRS port to one or more of the following in different subbands: different power amplifiers PA, different sounding reference signal SRS ports, and different first signal ports; and/or the first device has the capability to map the same data stream of the first signal to one or more of the following in different subbands: different PAs, different SRS ports, and different first signal ports.

Correspondingly, in step 401, a first signal and a DMRS corresponding to the first signal is sent to the second device according to the first information.

In the embodiment of the present disclosure, optionally, before step 401, the method may further include: receiving second information from the second device.

Correspondingly, in step 401, the first signal and the DMRS corresponding to the first signal are sent to the second device according to the second information.

Wherein, the second information indicates at least one of the following:
(1) a first power control strategy used by the first device;
(2) the first device sending the first signal with the maximum transmission power;
(3) the first device mapping the same DMRS port to different PAs, SRS ports and/or first signal ports in different subbands;
(4) a first transmission mode used by the first device;
(5) a precoding matrix of the first signal being a codeword whose number of transmission streams is less than or equal to K, where K is an integer greater than or equal to 1;
(6) the number of transmission streams of the first signal being less than or equal to M, where M is an integer greater than or equal to 1;
(7) the precoding matrix of the first signal being a noncoherent codeword;
(8) the precoding matrix of the first signal being the noncoherent codeword or a partially coherent codeword;
(9) the precoding matrix of the first signal being the partially coherent codeword.
(10) The first device mapping the same data stream to different PA, SRS ports and/or first signal ports in different subbands.

Wherein, the first power control strategy may include: a control strategy for scaling the transmission power of the first signal according to the ratio of the quantity of DMRS ports mapped to the data transmission of the first signal to the quantity of all the DMRS ports configured by the second device for the first signal or the ratio of the quantity of the SRS ports mapped to data transmission of the first signal to the quantity of all the SRS ports configured by the second device for the first signal.

The first power control strategy may also be a power control strategy corresponding to the transmission method for transmitting the first signal according to the embodiment of the present disclosure. In this case, the transmission scheme in the embodiment of the present disclosure is adopted.

If the power control strategy indicated by the second device is a power control strategy in which the first device cannot transmit data at full power, the scheme in the embodiment of the present disclosure may not be used to transmit the first signal, but a conventional codebook-based uplink transmission scheme is used for the transmission of the first signal.

The transmission mode of the first signal may be a transmission mode based on the solution in the present disclosure, or the like.

If the transmission mode indicated by the second device is conventional codebook-based uplink transmission, etc., the method proposed in the embodiment of the present disclosure is not used for the transmission of the first signal, but the transmission scheme corresponding to the transmission mode indicated by the second device is used for the transmission of the first signal.

In the embodiment of the present disclosure, optionally, the method may further include: receiving third information from the second device, the third information indicating the correspondence between the DMRS port and the SRS port; or sending the third information to the second device, the third information indicating the correspondence between the DMRS port and the SRS port.

The first device may send the first signal and its corresponding DMRS according to the third message.

In the embodiment of the present disclosure, optionally, the method may further include: receiving a message indicating the correspondence between the DMRS port and the PA from the second device; or sending to the second device a message indicating that the third information indicates the correspondence between the DMRS port and the PA. In the embodiment of the present disclosure, optionally, before step 401, the method may further include: according to the first rule, or according to the signaling indicated by the network side, determining at least one of the following:

(1) a precoding matrix used by the first signal and/or the DMRS corresponding to the first signal in each subband;

(2) PA used by the first signal and/or the DMRS corresponding to the first signal in each subband;

(3) SRS port corresponding to the first signal and/or the DMRS corresponding to the first signal in each subband.

In the embodiment of the present disclosure, optionally, the first rule is determined or instructed by the network side, or the first rule is agreed by a protocol.

In the embodiment of the present disclosure, if the first signal is an uplink signal, the network side is the second device, and the network side indication message or signaling is an indication message or signaling from the second device to the first device; if the first signal is a downlink signal, the network side is the first device, and the network side indication message or signaling is an indication message or signaling from the first device to the second device.

In the embodiment of the present disclosure, optionally, the method further includes: sending signaling to the second device, where the signaling indicates at least one of the following:

(1) The precoding matrix used by the first signal in each subband in the frequency domain resource or the system bandwidth or the BWP where the first signal is scheduled;

(2) The DMRS port corresponding to the first signal in each subband in the frequency domain resource or the system bandwidth or the BWP where the first signal is scheduled;

(3) The PA used by the first signal in each subband in the frequency domain resource or the system bandwidth or the BWP where the first signal is scheduled;

(4) The SRS port corresponding to the first signal in each subband in the frequency domain resource or the system bandwidth or the BWP where the first signal is scheduled.

(5) The PA used by the DMRS corresponding to the first signal in each subband in the frequency domain resource or the system bandwidth or the BWP where the first signal is scheduled;

(6) The SRS port corresponding to the DMRS port corresponding to the first signal in each subband in the frequency domain resource or the system bandwidth or the BWP where the first signal is scheduled.

In the embodiment of the present disclosure, optionally, the signaling may include:

(1) A precoding matrix of one subband; or, (2) A plurality of precoding matrices, where the precoding matrices in the plurality of precoding matrices and subbands have a predefined correspondence relationship, for example, the precoding matrices and in the plurality of precoding matrices the subbands have a one-to-one correspondence relation.

In the embodiment of the present disclosure, optionally, the method may further include: if the first signal is a downlink signal, the first device sends the following information to the second device:

(1) The precoding matrix used by the first signal in each subband in the frequency domain resource or the system bandwidth or the BWP where the first signal is scheduled;

(2) The DMRS port corresponding to the first signal in each subband in the frequency domain resource or the system bandwidth or the BWP where the first signal is scheduled;

(3) The PA used by the first signal in each subband in the frequency domain resource or the system bandwidth or the BWP where the first signal is scheduled;

(4) The SRS port corresponding to the first signal in each subband in the frequency domain resource or the system bandwidth or the BWP where the first signal is scheduled.

(5) The PA used by the DMRS corresponding to the first signal in each subband in the frequency domain resource or the system bandwidth or the BWP where the first signal is scheduled;

(6) The SRS port corresponding to the DMRS port corresponding to the first signal in each subband in the frequency domain resource or the system bandwidth or the BWP where the first signal is scheduled.

Optionally, the information is carried by the following information:

(1) A precoding matrix of a predefined subband; or, (2) A plurality of precoding matrices, where the precoding matrices in the plurality of precoding matrices and subbands have a predefined correspondence relationship, for example, the precoding matrices in the plurality of precoding matrices and the subbands have a one-to-one correspondence relation.

In the embodiment of the present disclosure, optionally, the subband used by the first signal is determined by at least one of the following methods:

(1) determining by division according to a quantity of subbands and resources allocated by the second device for the first signal, wherein the quantity of subbands is pre-agreed by the first device and the second device;

Exemplarily, for uplink transmission, the first device determines the frequency domain positions corresponding to the S subbands according to the resources allocated by the second device for the first signal. For downlink transmission, the second device determines the frequency domain positions corresponding to the S subbands according to the resources allocated by the first device for the first signal.

(2) determining according to subband division in a system bandwidth or the BWP of the first signal and scheduling information of the first signal.

Exemplarily, the system bandwidth or bandwidth part (BWP) of the first signal is divided into S subbands, and the subband of the first signal (and the corresponding DMRS, etc.) is determined according to which subband the resource scheduled by the second device for the first signal falls.

In the embodiment of the present disclosure, optionally, the subband used by the first signal is determined by the system bandwidth or bandwidth part of the first signal according to a predefined subband division mode.

In the embodiment of the present disclosure, optionally, the subband in the system bandwidth or bandwidth portion of the first signal or in the scheduled resource of the first signal is determined according to a predefined subband division mode.

In the embodiment of the present disclosure, optionally, the predefined subband division mode includes that: the system bandwidth or BWP for transmission of the first signal or the scheduled resource of the first signal includes S subbands, and the minimum unit of each subband is P consecutive PRBs. In one subband, a minimum unit appears every P*S PRBs, where the P is an integer greater than or equal to 1, the S is a positive integer, and the S is configured by the network side or agreed by a protocol.

In the embodiment of the present disclosure, optionally, the P is configured by the network side or agreed by a protocol.

In the embodiment of the present disclosure, optionally, the value of S is the same as the number of antenna ports of the SRS resource configured by the network side for the first signal.

In the embodiment of the present disclosure, optionally, the S is determined by the PA capability of the first device.

In the embodiment of the present disclosure, optionally, the predefined subband division mode includes at least one of the following:

(1) One or more DMRS ports correspond to one subband;
(2) One DMRS port corresponds to one or more subbands.

In the embodiment of the present disclosure, optionally, the method may further include: determining physical resource block PRB for transmitting the DMRS according to the resource indication information of the first signal.

In the embodiments of the present disclosure, optionally, one DMRS is only sent on a PRB that has a data stream transmission corresponding to the DMRS port.

In the embodiment of the present disclosure, optionally, the method further includes: receiving DMRS resource indication information sent by the second device, where the DMRS resource indication information indicates a frequency domain resource location of the DMRS port; determining the frequency domain resource location of the DMRS corresponding to the first signal according to the DMRS resource indication information.

In the embodiment of the present disclosure, optionally, the method further includes: receiving subband resource indication information sent by the second device, where the subband resource indication information indicates a frequency domain resource location of each subband; determining the frequency domain resource location of each subband according to the subband resource indication information.

In the embodiment of the present disclosure, optionally, the method further includes: sending DMRS resource indication information to the second device, where the DMRS resource indication information indicates the frequency domain resource location of the DMRS port.

In the embodiment of the present disclosure, optionally, the method further includes: sending subband resource indication information to the second device, where the subband resource indication information indicates the frequency domain resource location of each subband.

In the embodiment of the present disclosure, optionally, the sending the first signal to the second device includes: sending the first signal to the second device through a first transmission mode, where the first transmission mode includes at least one of the following:

Each data stream of the first signal is transmitted on all PRBs of the transmission resource indicated by the second device for the first device;

Each data stream of the first signal is only transmitted on a PRB where the DMRS port corresponding to the data stream is located.

In the embodiment of the present disclosure, optionally, the method further includes: receiving resource indication information of the first signal from the second device; determining a transmission resource of the first signal according to the resource indication information.

Wherein, the resource indication information indicates at least one of the following:

(1) a resource allocation situation of the first signal in the entire bandwidth or BWP;
(2) a resource allocation situation of the first signal in a predefined subband;
(3) a resource allocation situation of the first signal in one or more subbands.

In the embodiment of the present disclosure, optionally, the method further includes: sending the resource indication information of the first signal to the second device;

Wherein, the resource indication information indicates at least one of the following:

(1) a resource allocation situation of the first signal in the entire bandwidth or BWP;
(2) a resource allocation situation of the first signal in a predefined subband;
(3) a resource allocation situation of the first signal in one or more subbands.

In the embodiment of the present disclosure, optionally, the resource allocation mode of the SRS port includes any one of the following:

(1) The resource allocation of the SRS port is irrelevant to the mapping between the DMRS port and the SRS port;
(2) The SRS port is only mapped on a part of the subband.

In the embodiment of the present disclosure, optionally, the first signal performs rate matching based on the actual transmission condition of the DMRS port; and/or, the first signal performs rate matching based on the assumption that a DMRS port with data stream mapping exists in each PRB.

For example, rate matching is performed according to the actual transmission situation of the DMRS port. For example, if one DMRS port is only mapped to odd-numbered PRBs, rate matching is performed on the RE occupied by the DMRS port in the odd-numbered PRBs, and the rate matching is not performed on the DMRS port in the even-numbered PRBs.

For another example, the first signal performs rate matching based on the assumption that a DMRS port with data stream mapping exists in each PRB. For example, even if one DMRS port is only mapped to odd-numbered PRBs, the rate matching is still performed for this DMRS port on all PRBs during PUSCH transmission.

In the embodiments of the present disclosure, when each PA of the UE cannot perform transmission at full power, uplink signals are simultaneously transmitted in different bandwidths using different PAs to achieve full power transmission, and the transmission power of the UE can be adjusted more effectively, UE performance and system performance are improved.

Referring to FIG. 5, an embodiment of the present disclosure provides a data transmission method. The execution body of the method is a second device and includes step 501. The specific steps are as follows:

Step 501: detecting a first signal sent by a first device and DMRS corresponding to the first signal; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

It can be understood that the subband may be a subband of the scheduled bandwidth of the first signal, or may also be a subband obtained by dividing the entire bandwidth.

In the embodiment of the present disclosure, optionally, the first signal may be an uplink signal, the first device is a terminal, and the second device is a network device; or, the first signal may also be a downlink signal, the first device is the network device, and the second device is the terminal. Optionally, the first signal port is a PUSCH port.

In the embodiment of the present disclosure, optionally, the method further includes: separately performing channel estimation on the same DMRS port and/or the first signal in different subbands.

In the embodiment of the present disclosure, optionally, channel estimation is performed on the same data stream of the first signal in different subbands.

In the embodiment of the present disclosure, optionally, the method further includes: dividing the scheduling bandwidth of the first signal into N subbands when scheduling the first signal, and calculating signal to interference and noise ratios of different subbands based on different SRS ports and/or different precoding matrices, N is an integer greater than 1.

In the embodiment of the present disclosure, optionally, before the step of detecting the first signal sent by the first device and the DMRS corresponding to the first signal, the method further includes: receiving fourth information from the first device, where the fourth information indicates at least one of the following:
   (1) The coherent transmission capability of the first device;
   (2) The capability of the first device to transmit the first signal with the maximum transmission power.
   (3) The first device has the capability to map the same DMRS port to different PAs, SRS ports, and/or first signal ports in different subbands;
   (4) The first device has the capability to map the same data stream of the first signal to different PAs, SRS ports and/or first signal ports in different subbands.

In the embodiment of the present disclosure, optionally, the method further includes: receiving first information from the first device, the first information indicating that the first device has the capability to transmit the first signal with maximum transmission power; and/or the first device has the capability to map the same DMRS port to one or more of the following in different subbands: different PAs, SRS ports, and first signal ports.

The second device may detect the first signal and/or the DMRS corresponding to the first signal according to the first message.

In the embodiment of the present disclosure, optionally, before step 501, the method may further include: sending second information to the first device, where the second information indicates at least one of the following:
   (1) a first power control strategy used by the first device;
   (2) the first device sending the first signal and the DMRS corresponding to the first signal by using the maximum transmission power;
   (3) the precoding matrix of the first signal being a codeword whose number of transmission streams is less than or equal to K, where K is an integer greater than or equal to 1;
   (4) the number of transmission streams of the first signal being less than or equal to M, where M is an integer greater than or equal to 1;
   (5) the precoding matrix of the first signal being a non-coherent codeword;
   (6) the precoding matrix of the first signal being a non-coherent codeword or a partially coherent codeword;
   (7) a first device mapping the same DMRS port to different PA, SRS ports and/or first signal ports in different subbands;
   (8) the precoding matrix of the first signal being a partially coherent codeword;
   (9) the first transmission mode used by the first device;
   (10) the first device mapping the same data stream of the first signal to different PAs, SRS ports and/or first signal ports in different subbands.

Wherein, the first power control strategy may include: a control strategy for scaling the transmission power of the first signal according to the ratio of the quantity of DMRS ports mapped to the data transmission of the first signal to the quantity of all the DMRS ports configured by the second device for the first signal or the ratio of the quantity of the SRS ports mapped to data transmission of the first signal to the quantity of all the SRS ports configured by the second device for the first signal.

The first power control strategy may also be a power control strategy corresponding to the transmission method for transmitting the first signal according to the embodiment of the present disclosure. In this case, the transmission scheme in the embodiment of the present disclosure is adopted.

If the first power control strategy is a power control strategy in which the first device cannot transmit at full power, the scheme proposed in the embodiments of the present disclosure may not be used to transmit the first signal, but a conventional codebook-based uplink transmission scheme may be used to transmit the first signal.

The transmission mode of the first signal may be a conventional codebook-based transmission mode, a transmission mode based on the solution proposed in the present disclosure, and the like.

It is understandable that the transmission power of the first signal may be the transmission power calculated by the first device according to the power control formula in the related art. For example, in PUSCH, it is calculated according to the formula $P_{PUSCH,b,f,c}$ (i,j,$q_d$,l) in section 7.1.1 of TS38.213 in the current 3GPP NR system.

In the embodiment of the present disclosure, optionally, the method may further include: receiving the second information sent by the first device, and detecting the first signal and the DMRS corresponding to the first signal according to the second information. Wherein, the second information indicates at least one of the following:
   (1) a first power control strategy used by the first device;
   (2) the first device sending the first signal and the DMRS corresponding to the first signal by using the maximum transmission power;
   (3) the precoding matrix of the first signal being a codeword whose number of transmission streams is less than or equal to K, where K is an integer greater than or equal to 1;
   (4) the number of transmission streams of the first signal being less than or equal to M, where M is an integer greater than or equal to 1;
   (5) the precoding matrix of the first signal being a non-coherent codeword;

(6) the precoding matrix of the first signal being a non-coherent codeword or a partially coherent codeword;
(7) a first device mapping the same DMRS port to different PA, SRS ports and/or first signal ports in different subbands;
(8) the precoding matrix of the first signal being a partially coherent codeword;
(9) the first transmission mode used by the first device;
(10) the first device mapping the same data stream of the first signal to different PAs, SRS ports and/or first signal ports in different subbands.

The second device may detect the first signal and/or the DMRS corresponding to the first signal according to the second message.

In the embodiment of the present disclosure, optionally, before step 501, the method may further include: sending third information to the first device, where the third information indicates the correspondence between the DMRS port and the SRS port.

In the embodiment of the present disclosure, optionally, the method may further include: receiving third information sent by the first device, where the third information indicates the correspondence between the DMRS port and the SRS port.

In the embodiment of the present disclosure, optionally, before step 501, the method may further include: sending signaling to the first device, where the signaling is used by the first device to determine at least one of the following:
(1) a precoding matrix used by the first signal and/or the DMRS port corresponding to the first signal in each subband in the frequency domain resource or the system bandwidth or the BWP where the first signal is scheduled;
(2) a PA used by the first signal and/or the DMRS port corresponding to the first signal in each subband in the frequency domain resource or the system bandwidth or the BWP where the first signal is scheduled;
(3) a SRS port corresponding to the first signal and/or the DMRS port corresponding to the first signal in each subband in the frequency domain resource or the system bandwidth or the BWP where the first signal is scheduled.

In the embodiment of the present disclosure, optionally, before step 501, the method may further include: receiving signaling from the first device, where the signaling indicates at least one of the following:
(1) The precoding matrix used by the first signal in each subband in the frequency domain resource or the system bandwidth or the BWP where the first signal is scheduled;
(2) The DMRS port corresponding to the first signal in each subband in the frequency domain resource or the system bandwidth or the BWP where the first signal is scheduled;
(3) The PA used by the first signal in each subband in the frequency domain resource or the system bandwidth or the BWP where the first signal is scheduled;
(4) The SRS port corresponding to the first signal in each subband in the frequency domain resource or the system bandwidth or the BWP where the first signal is scheduled;
(5) The PA used by the DMRS corresponding to the first signal in each subband in the frequency domain resource or the system bandwidth or the BWP where the first signal is scheduled;
(6) The SRS port corresponding to the DMRS port corresponding to the first signal in each subband in the frequency domain resource or the system bandwidth or the BWP where the first signal is scheduled.

The second device may detect the first signal and/or the DMRS corresponding to the first signal according to the signaling.

In the embodiment of the present disclosure, optionally, the signaling may include: a precoding matrix of one subband; or, a plurality of precoding matrices, where the precoding matrices in the plurality of precoding matrices and subbands have a predefined correspondence relationship, for example, the precoding matrices and in the plurality of precoding matrices the subbands have a one-to-one correspondence relation.

In the embodiment of the present disclosure, optionally, the subband of the first signal is determined by at least one of the following methods:
(1) determining by division according to a quantity of subbands and resources allocated by the second device for the first signal, wherein the quantity of subbands is pre-agreed by the first device and the second device;

Exemplarily, for uplink transmission, the first device determines the frequency domain positions corresponding to the S subbands according to the resources allocated by the second device for the first signal. For downlink transmission, the second device determines the frequency domain positions corresponding to the S subbands according to the resources allocated by the first device for the first signal.

(2) determining according to subband division in a system bandwidth or the BWP of the first signal and scheduling information of the first signal. Exemplarily, the system bandwidth or bandwidth part (BWP) of the first signal is divided into S subbands, and the subband of the first signal (and the corresponding DMRS, etc.) is determined according to which subband the resource scheduled by the second device for the first signal falls.

In the embodiment of the present disclosure, optionally, the system bandwidth or bandwidth part (bandwidth Part, BWP) of the first signal or the subband of the scheduled resource of the first signal is determined according to a predefined subband division mode.

Exemplarily, the system bandwidth or BWP of the first signal or the scheduled resource of the first signal is divided into S subbands, and the subband corresponding to the resource scheduled by the second device for the first signal is determined as the subband used by the first signal, where the subband corresponding to the resource scheduled by the second device for the first signal refers to a subband in the overall system bandwidth or BWP or the resource scheduled for the first signal in which subband of the resource scheduled by the second device for the first signal falls. For example, the BWP of the first signal has a total of 20 PRBs, numbered PRB 0-PRB 19, which are divided into subband 1 and subband 2, where subband 1 is PRB 0-PRB 9, and subband 2 is PRB 10-PRB 19. If the resource scheduled for the first signal is transmitted in PRB 8 to PRB 10, PRB 8 and PRB 9 are the first subband, and PRB 10 is the second subband. If the resources scheduled for the first signal are transmitted in PRB 10-PRB 13, there is only one subband in the first signal, that is, PRB 10-PRB 13 in subband 2.

(3) obtained by division of the resources allocated for the first signal. If the first signal is a downlink signal, the first device may obtain the subband by dividing the resources allocated for the first signal.

Optionally, the correspondence between the physical resources that can be mapped by the DMRS port and the subbands is predefined by the protocol.

Optionally, the correspondence between the physical resources that can be mapped by the DMRS port and the subbands is indicated by the network device through signaling.

Optionally, the correspondence between the PA or SRS port that can be mapped by the DMRS port and the subbands is predefined by the protocol.

Optionally, the correspondence between the PA or SRS port that can be mapped by the DMRS port and the subbands is indicated by the network device through signaling.

Optionally, the correspondence between the SRS port and the subband is predefined by the protocol.

Optionally, the correspondence between the SRS port and the subband is indicated by the network device through signaling.

In this disclosure, the signaling indicated by the network device may be RRC signaling, or MAC layer signaling, or physical layer signaling (such as signaling indicated by DCI).

In the embodiment of the present disclosure, optionally, the subband in the system bandwidth or bandwidth portion of the first signal or in the scheduled resource of the first signal is determined according to a predefined subband division mode.

In the embodiment of the present disclosure, optionally, the predefined subband division mode includes:

The system bandwidth or BWP of the first signal or the scheduled resource of the first signal includes S subbands, and the minimum unit of each subband is P consecutive PRBs. In one subband, a minimum unit appears every P*S PRBs, where the P is an integer greater than or equal to 1, the S is a positive integer, and the S is configured by the network side or agreed by a protocol.

In the embodiment of the present disclosure, optionally, the P is configured by the network side or agreed by a protocol.

In the embodiment of the present disclosure, optionally, the value of S is the same as the number of antenna ports of the SRS resource configured by the network side for the first signal.

In the embodiment of the present disclosure, optionally, the S is determined by the PA capability of the first device.

In the embodiment of the present disclosure, optionally, the predefined subband division mode includes at least one of the following:
(1) One or more DMRS ports correspond to one subband;
(2) One DMRS port corresponds to one or more subbands.

In the embodiment of the present disclosure, optionally, before step 501, the method may further include: sending resource indication information to the first device; wherein the resource indication information indicates at least one of:
(1) a resource allocation situation of the first signal in the entire bandwidth or BWP;
(2) a resource allocation situation of the first signal in a predefined subband;
(3) a resource allocation situation of the first signal in one or more subbands.

In the embodiment of the present disclosure, optionally, before step 501, the method may further include: sending DMRS resource indication information to the first device, where the DMRS resource indication information indicates the frequency domain resource location of the DMRS port.

In the embodiment of the present disclosure, optionally, before step 501, the method may further include: determining position offset of the subband in the frequency domain resource or the system bandwidth or the BWP in which the first signal is scheduled according to the instruction information of the first device or a protocol agreement.

In the embodiment of the present disclosure, optionally, before step 501, the method may further include: sending subband resource indication information to the first device, where the resource indication information indicates at least one of the following:
(1) a resource allocation situation of the first signal in the entire bandwidth or BWP;
(2) a resource allocation situation of the first signal in a predefined subband;
(3) a resource allocation situation of the first signal in one or more subbands.

In the embodiment of the present disclosure, optionally, before step 501, the method further includes: determining the PRB to which the DMRS is mapped according to the resource indication information of the first signal sent by the first device and the precoding of the first signal.

In the embodiment of the present disclosure, optionally, the resource allocation mode of the SRS port includes at least one of the following:
(1) The resource allocation of the SRS port is irrelevant to the mapping between the DMRS port and the SRS port;
(2) The SRS port is only mapped on a part of the bandwidth allocated by the second device for the SRS port.

In the embodiment of the present disclosure, optionally, the detecting the first signal sent by the first device includes: detecting the first signal sent by the first device on all PRBs of the transmission resources indicated by the second device for the first device; or detecting the first signal sent by the first device on all PRBs of the transmission resources indicated by the first device for the second device; or, detecting the first signal sent by the first device on a PRB where the DMRS port corresponding to each data stream of the first signal is located.

The embodiments of the present disclosure can enable the terminal to more effectively use the transmission power of the PA, and improve the performance of the terminal and the system performance.

The following is an example of upstream transmission. It is understood that the embodiments of the present disclosure are also applicable to downstream transmission.

For example, the first signal is the uplink signal, the first device is the UE, and the second device is the network device.

Transmission scheme: the UE sends an uplink signal and the DMRS corresponding to the uplink signal to the network device, where the uplink signal includes at least one data stream, and each data stream (or layer) corresponds to one DMRS port and one DMRS port on different sub-bands of the scheduled bandwidth of the uplink signal correspond to different power amplifiers (PAs), SRS ports and/or PUSCH ports.

In this way, the UE can use different PAs on different subbands to transmit the same DMRS port and its corresponding uplink signal data stream. If one DMRS port corresponds to different SRS ports and/or PUSCH ports in different subbands, it essentially means that in different subbands, one DMRS port is mapped to SRS port (and/or PUSCH port) using different precoding matrices.

Optionally, different data streams of the uplink signal correspond to different DMRS ports.

Optionally, the uplink signal is a signal carried by PUSCH. Optionally, the uplink signal is a signal carried by PUCCH.

Optionally, the network device sends indication information of the SRS port and/or PA corresponding to the DMRS port to the UE. For example, for a PUSCH that can be transmitted by 4 antenna ports, the network device indicates to the UE that SRS ports corresponding to the first and third DMRS ports are SRS ports 0 and 1, and SRS ports corresponding to the second and fourth DMRS ports are SRS ports 3 and 4.

Optionally, when the UE transmits an uplink signal, it does not scale the uplink transmission power calculated according to the uplink power control, but divides the uplink transmission power equally on all first signal ports corresponding to uplink signal transmission.

For example, the UE also receives the indication information about the precoding matrix sent by the network device. When the UE transmits the uplink signal, it does not scale the transmission power of the uplink signal according to the proportion of non-zero elements in the precoding matrix, but directly equally divides the transmission power of the uplink signal on the antenna ports corresponding to the non-zero elements of the precoding matrix. In this way, even if each PA of the UE cannot reach the maximum output power corresponding to the PC capability of the UE, the UE can still use the maximum output power to perform uplink transmission when the network device indicates to the UE incoherent transmission codewords or partial coherent transmission codewords.

Optionally, the UE reports to the network device that it has the capability to transmit at full power, and when the UE reports the capability to transmit at full power, the above transmission scheme is used for transmission; otherwise, the uplink transmission scheme in the related art is used for transmission.

Optionally, the network device indicates the uplink power control scheme and/or transmission scheme to the UE. When the network device instructs the UE to use full power to transmit the corresponding uplink power control scheme or when the network device instructs the UE to use the above transmission scheme, the UE adopts the above transmission scheme for transmission; otherwise, the uplink transmission scheme in the related art is used for transmission.

Optionally, when the network device indicates to the UE that the precoding matrix of the first signal is a codeword whose number of transmission streams is less than or equal to K, the UE uses the above transmission scheme for transmission; otherwise, the uplink transmission scheme in the related art is used for transmission, where, K is a predefined integer greater than or equal to 1. Further, the predefined mode may be instructed by the network device to the UE, or may be agreed upon by a protocol.

Optionally, when the number of transmission streams of the uplink signal indicated to the UE by the network device is less than or equal to K, the UE uses the above transmission scheme for transmission; otherwise, the uplink transmission scheme in the related art is used for transmission, where K is a predefined value greater than or equal to 1. Further, the predefined mode may be instructed by the network device to the UE, or may be agreed upon by a protocol.

Optionally, when the precoding matrix indicated by the network device to the UE is a noncoherent codeword, the UE uses the above transmission scheme for transmission; otherwise, it uses an uplink transmission scheme in the related art for transmission.

Optionally, when the precoding matrix indicated by the network device to the UE is a non-coherent codeword or a partially coherent codeword, the UE uses the above-mentioned transmission scheme for transmission; otherwise, the uplink transmission scheme in the related are is used for transmission.

Optionally, the behavior of the network device is: detecting the uplink signal and the DMRS corresponding to the uplink signal, wherein when channel estimation is performed on the DMRS, channel estimation is separately performed on the same DMRS port in different subbands, and when channel estimation is performed on the data stream of the uplink signal, channel estimation is separately performed on the same data stream of the uplink signal in different subbands.

Optionally, when scheduling the uplink signal, the scheduled bandwidth is divided into N subbands, and each subband uses a different SRS port and/or a different precoding matrix to calculate the signal-to-interference and noise ratio, thereby further determining information such as the number of transmission steams of the uplink signal and a MCS level.

Optionally, the network device uses the corresponding method to perform processing only when the aforementioned condition that the UE performs the transmission of the solution proposed in the present disclosure is met.

Optionally, the network device only adopts the solution proposed in the present disclosure for UEs whose transmission capabilities are partially coherent or non-coherent.

It is understandable that the embodiments of the present disclosure may also be used for downlink transmission, and the first signal is a downlink signal. The first device is a network device, and the second device is a UE. The downlink signal may be a signal carried by a physical layer downlink shared channel (PDSCH), a signal carried by a physical downlink control channel (PDCCH), and so on.

1. The indication and determination of the uplink signal and DMRS corresponding to the uplink signal on uplink procoding and/or the subband PA and/or the SRS port corresponding to the subband in each subband.

Optionally, the UE determines at least one of the following information according to a predefined rule:
(1) the precoding matrix used by the uplink signal and DRMS corresponding to the uplink signal in each subband;
(2) PA used by the uplink signal and DRMS corresponding to the uplink signal in each subband;
(3) SRS port corresponding to used by the uplink signal and DRMS corresponding to the uplink signal in each subband.

The predefined rule may be predetermined by the UE and the network device, or may be instructed to the UE by the network device.

Some possible single-stream transmission pre-defined rules are:
(1) In single-stream transmission, at the nth subband (for example, a subband with the nth smallest starting PRB number, n is an integer, $1 \leq n \leq N$, assuming there are N subbands in total), SRS port corresponding to the data stream and the DMRS port has the n-th smallest number (and/or the PA corresponding to the data stream and the DMRS port is the n-th PA).
(2) Assuming that the PUSCH is a single stream transmission of P antenna ports, the precoding matrix of the nth subband is a P-dimensional column vector with the nth element being 1, and the other elements being 0.
(3) In different subbands, the SRS ports corresponding to the data stream and DMRS port are different SRS ports in the same coherent transmission antenna port group (and/or the PAs corresponding to the data stream and DMRS port are different PAs in the same coherent transmission antenna group).

(4) In different subbands, the SRS ports corresponding to data streams and DMRS ports are SRS ports in different coherent transmission antenna port groups (and/or the PAs corresponding to data streams and DMRS ports are PAs in different coherent transmission antenna groups).

In multi-stream transmission, there can be some other predefined rules.

For example, in different subbands, SRS ports corresponding to one data stream and/or one DMRS port are different SRS ports in the same coherent transmission antenna port group (and/or the PA corresponding to one data stream and/or one DMRS port is a PA in the same coherent transmission antenna group).

For another example, in different subbands, the SRS ports corresponding to one data stream and/or one DMRS port are different SRS ports in different coherent transmission antenna port groups (and/or the PA corresponding to one data stream and/or one DMRS port is a PA in a different coherent transmission antenna group).

Optionally, the network device indicates to the UE the uplink precoding matrix of the uplink signal and the DMRS port corresponding to the uplink signal in each subband through signaling.

Optionally, the network device indicates to the UE the PA corresponding to the uplink signal and the DMRS port corresponding to the uplink signal in each subband through signaling.

Optionally, the network device indicates to the UE the SRS port corresponding to the uplink signal and the DMRS port corresponding to the uplink signal in each subband through signaling.

Optionally, the scheduling information of the uplink signal indicated by the network device to the UE does not include a precoding indication, and only the indication for the number of transmission streams (that is, rank). After the UE obtains the information indicating the number of transmission streams, it can use a predefined rule to transmit the uplink signal.

For example, for a UE with 2-antenna for transmission, if the network device instructs the UE to perform single-stream transmission of PUSCH, the UE will perform transmission corresponding to the first SRS port in subband 0, and perform transmission corresponding to the second SRS port in subband 1. If the network device instructs the UE to perform two-stream transmission of PUSCH, the UE will perform transmission corresponding to the first SRS port in the first steam, and perform transmission corresponding to the second SRS port in the second stream.

Optionally, the above-mentioned signaling is RRC signaling, or DCI, or MAC-CE signaling. The above-mentioned signaling may be one signaling or multiple different signaling.

Optionally, the network device indicates the above-mentioned signaling by indicating the uplink precoding matrix to the UE (for example, indicating the TPMI by means of DCI). The UE determines, according to the uplink precoding matrix indicated by the network device, the uplink signal and the DMRS port corresponding to the uplink signal on each subband: a precoding matrix, a PA, and a corresponding SRS port.

Optionally, the indication of the uplink precoding matrix is indicated in the following modes.

Mode 1: The network device indicates a precoding matrix to the UE, where the precoding matrix is a precoding matrix of a predefined subband. The UE determines one or more of the following of predefined subbands and other subbands according to the precoding matrix and the predefined rules indicated by the network device: the precoding matrix, the PA, and the corresponding SRS port.

Among them, the predefined subband may be pre-agreed by the network device and the UE, may also be instructed by the network device, or may be a default subband. For example, the predefined subband is a subband with the smallest starting PRB number. For another example, the predefined subband is the subband numbered 0.

Among them, the predefined rule may be pre-agreed by the network device and the UE, or may be a default rule.

For example, the predefined rule is that each precoding matrix is in a predefined precoding matrix group, and the network device indicates the precoding matrix of the predefined subband for the UE. It is assumed that the precoding matrix is the m-th precoding matrix in the precoding matrix group, and precoding matrices of the remaining subbands are $$\begin{cases} \mod(m+k, M), & k \neq M-m \\ M, & k = M-m \end{cases} -th$$

precoding matrix in the precoding matrix group, where M is the quantity of precoding matrices included in the precoding matrix group (M≥1).

For another example, the predefined rule is that the PRB scheduled for the uplink signal is divided into N subbands, and one DMRS port in different subbands (bandwidth) corresponds to different Pas and/or SRS ports, and the precoding matrix of the subband with the smallest starting PRB number is the precoding matrix indicated by the network device, the precoding matrix of the subband with the second smallest starting PRB number is once cyclic shift of the precoding matrix indicated by the network device, and the precoding matrix of the subband with the third smallest starting PRB number is twice cyclic shifts of the precoding matrix indicated by the network device, . . . , the precoding matrix of the subband with the Nth smallest starting PRB number is the N−1 times cyclic shift of the precoding matrix indicated by the network device. Among them, once cyclic shift means that the elements of the column vectors in the precoding matrix is cyclically shifted down by 1 bit.

Mode 2: Assuming that there are N subbands in total, the network device indicates the N precoding matrices to the UE, and the precoding matrixes correspond to the subbands in a one-to-one manner. The UE determines the precoding matrixes, PA and/or corresponding SRS ports of the predefined subband and other subbands according to the precoding matrix indicated by the network device. Optionally, the nth precoding matrix corresponds to the subband with the nth smallest starting PRB number (n is an integer, 1≤n≤N). Optionally, the overhead of the precoding matrix in the DCI is determined according to the quantity of subbands.

Mode 3: The base station indicates the candidate precoding matrix set to the UE, and the UE uses different precoding matrices in the candidate precoding matrix set in different subbands to perform transmission of the uplink signal and the DMRS port corresponding to the uplink signal. For example, one SRS resource of the SRS corresponding to PUSCH includes 4 ports, and the base station indicates the precoding matrix [1 0 0 0] and [0 1 0 0] to the UE, and the UE uses [1 0 0 0] in the first subband to perform precoding on PUSCH and its corresponding DMRS, uses [0 1 0 0] in the second subband to perform precoding on PUSCH and its corresponding DMRS.

2. The allocation method of subbands.

One subband includes one or more PRBs using the same precoding matrix (or PA, or SRS port, and/or PUSCH port), one subband may be centralized or distributed.

(1) Centralized subband means that a subband includes a group of consecutive PRBs. An example is shown in FIG. 6.

Figure 7:
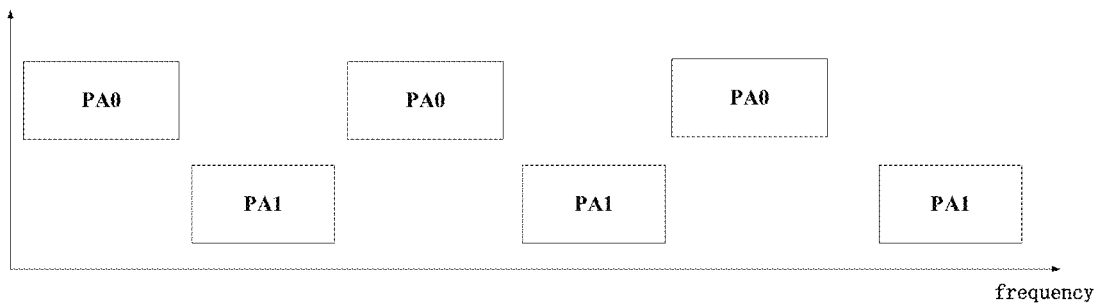
FIG. 7 is a schematic diagram of distributed subbands according to an embodiment of the present disclosure.

(2) Distributed subband means that a subband includes a plurality of non-consecutive PRBs, for example, a plurality of PRB groups, and each PRB group includes P consecutive PRBs, where P is an integer greater than or equal to 1. An example is shown in FIG. 7. Among them, all PRBs marked with PA0 indicate that they belong to the same subband and are transmitted using the PA marked with 0; all PRBs marked with PA1 indicate that they belong to another subband and are transmitted using the PA marked 1.

Optionally, the subband is determined according to scheduling information of the uplink signal.

For example, it is determined according to the PRB allocated by the network device for the uplink signal. For example, suppose there are S subbands in total, and the number of PRBs allocated by the network device for the uplink signal is M, then from $$(n-1)*\left\lfloor\frac{M}{S}\right\rfloor+1$$

to $$n*\left\lfloor\frac{M}{S}\right\rfloor PRSs$$

is nth subband, n=1, 2, . . . , S−1, from $$(S-1)*\left\lfloor\frac{M}{S}\right\rfloor+1$$

to S PRSs is the Sth subband.

For another example, suppose there are S subbands, the density of each subband is 1/S, and the minimum time unit of each subband is P PRBs, that is, from (n−1)*P+1 to n*P PRBs are the same subband, where n, P, and S are positive integers, and n S. In this way, no matter what the resource allocation of the uplink signal is, the transmission of the uplink signal can use more PA and thus can use a larger transmission power.

Optionally, the division of the subbands is a predefined mode and is determined by the following methods.

(1) the entire system bandwidth (the system bandwidth of uplink signal transmission) includes S subbands. The minimum unit of each subband is P consecutive PRBs. For one subband, a minimum unit appears every P*S PRBs. That is, on the system bandwidth, the nth P consecutive PRBs is the smallest unit of $$\begin{cases} \mathrm{mod}(n,S), & n \neq kS \\ S, & n = kS \end{cases} - th \text{ subband,}$$

where k is a positive integer, P is greater than or equal to 1, and S is a positive integer.

Optionally, S is an integer configured by the network, or S is an integer pre-agreed by the network device and the UE.

Optionally, the value of S is the same as the number of antenna port of the SRS resource configured by the base station for the uplink signal (for example, if the PUSCH is transmitted based on the codebook, the number of antenna port included in the SRS resource configured by the base station for the PUSCH is 4, then S=4).

Optionally, S is determined by the PA capability of the UE.

Optionally, the value of P is configured by the network device for the UE; optionally, the value of P is pre-agreed by the network device and the UE.

(2) one or more DMRS ports may be transmitted on one or more subbands.

When one DMRS port is distributed a plurality of subbands, the DMRS corresponds to different Pas, different SRS ports and/or different PUSCH ports in different subbands.

Optionally, one SRS corresponds to a fixed PA.

Optionally, one PUSCH port corresponds to one SRS port.

Optionally, the UE determines the PRB for sending the DMRS according to the resource indication information about the uplink signal sent by the network device. Optionally, DMRS is only sent on PRBs where data flow mapping exists.

For example, there are S=2 subbands in the system, the smallest unit of the subband is 1PRB, the PRB numbered 2k (k=0, 1, 2 . . . ) belongs to subband 0, and the PRB numbered 2k+1 (k=0, 1, 2 . . . ) belongs to subband 1. A DMRS port of the PUSCH corresponds to subband 0, a DMRS port (corresponds to subband 1. If the PRB allocated by the network device for the PUSCH is PRB 3-9, the UE sends DMRS port 0 on an even-numbered PRB of the scheduled PRBs, and sends DMRS port 1 on an odd-numbered PRB.

The advantage of this subband division method is that it is irrelevant to the scheduling information of the uplink signal, and can reduce the complexity of calculating the scheduling information of the uplink signal by the network device. The disadvantage is that if there are fewer PRBs scheduled for the uplink signal, it is possible that only part of PAs can be used for the transmission of the uplink signal, and the maximum transmission power cannot be reached.

Of course, the above-mentioned sub-band division methods can also be considered in combination. For example, when the system bandwidth is large, a predefined subband division mode is used; when the system bandwidth is small, a subband division mode determined according to the scheduling of the uplink signal is used.

When the subbands are distributed subbands, the network device may separately perform interpolation on different subbands when performing PUSCH channel estimation, so as to avoid performance loss caused by the joint channel estimation due to channel mismatch of different subbands. Correspondingly, when the first signal is a downlink signal, the UE needs to perform channel estimation on different subbands separately.

3. the resource allocation of DMRS.

Optionally, the resource allocation of the DMRS depends on the frequency domain offset of the PRB level or the PRB group level.

Among them, the frequency domain offset can be port-level. That is, the resource allocation of each DMRS port depends on the frequency domain offset of the DMRS port, and different ports can have different frequency domain offsets.

Wherein, the frequency domain offset may be configured by the network device through signaling (for example, configured through RRC signaling), or may be a fixed value agreed in the protocol.

Exemplarily, the frequency domain offset of a port level is N*P PRBs (N=0, 1, ..., S−1), where the value of N is the port number, and P is a positive integer (when P=1, it is the frequency domain offset of the PRB level; when P>1, it is the frequency domain offset of the PRB group level).

4. PUSCH transmission.

Optionally, the rate matching of the PUSCH is performed based on the actual transmitted DMRS, that is, the actual transmitted DMRS is avoided when the PUSCH mapping is performed, and the PUSCH can be transmitted at a position where the DMRS is not transmitted.

Optionally, the rate matching of the PUSCH is performed based on the actually transmitted DMRS, that is, the PUSCH performs rate matching based on the presence of a DMRS port corresponding to the PUSCH in each PRB. That is, corresponding to the DMRS port corresponding to PUSCH, no matter whether according to the conventional codebook-based uplink transmission scheme, whether there is DMRS transmission in the resource element (RE) corresponding to the DMRS port, no PUSCH transmission is performed on the RE. Exemplarily, suppose that the density of DMRS ports is: for each DMRS, every 2 PRBs are mapped to one PRB. Assuming that the scheduled PUSCH only has single-stream transmission corresponding to DMRS port 0, then the DMRS port is only transmitted on one PRB in every two PRBs, but when the PUSCH rate matching is performed, according to the pattern of DMRS port 0 on one PRB, the RE corresponding to the position of DMRS port 0 on each PRB does not map the PUSCH.

Optionally, the transmission mode of PUSCH can be any of the following:

Mode 1: Each data stream of the PUSCH is transmitted on all PRBs of the PUSCH resource indicated by the network device for the UE.

Mode 2: Each data stream of PUSCH is only transmitted on the PRB where the DMRS port corresponding to the data stream is located.

Optionally, the PUSCH resource allocation mode includes one or more of the following:

Mode 1: The network device indicates the resource allocation of the PUSCH in the entire bandwidth through signaling.

Mode 2: The network device indicates the resource allocation of the PUSCH in the predefined subband through signaling, and the UE calculates the resource allocation of other subbands according to the resource allocation of the subband. This method is suitable for the situation where the relative relationship of the resource allocation of each subband is fixed. For example, each subband occupies the same PRB, and the density of occupied resource is the same. For example, the scheduling resources of the PUSCH are divided into 2 subbands, the network device indicates the resource allocation of the first subband, and the UE obtains the resource allocation of the second subband according to the resource allocation of the subband.

Mode 3: The network device indicates the resource allocation of the PUSCH in each subband through signaling.

5. the power ratio of the DMRS in the embodiments of the present disclosure to the DMRS in the related art.

If the density of DMRS ports is 1/S, that is, the density of each DMRS port is that one PRB in every S PRBs includes the DMRS port (for example, the mapping method of each DMRS port is that every S PRBs (or a PRB group) is mapped to one PRB (or a PRB group)), during single-stream transmission, all DMRS ports are used for PUSCH transmission, a DMRS port can have log 10(K) dB power increasing compared with a DMRS port in related art.

For example, if the density of DMRS ports is 1/S, that is, the density of each DMRS port is that one PRB in every S PRBs includes the DMRS port (for example, the mapping method of each DMRS port is that every S PRBs (or a PRB Group) is mapped to one PRB (or a PRB group)), then if the number of transmission streams is R, each transmission stream corresponds to K DMRS ports, the DMRS port can have log 10(K)dB power increasing compared with a DMRS port in related art. Further, the power increase of the DMRS can bring about an improvement in the detection performance of the DMRS.

6. Transmission of SRS.

Figure 8:
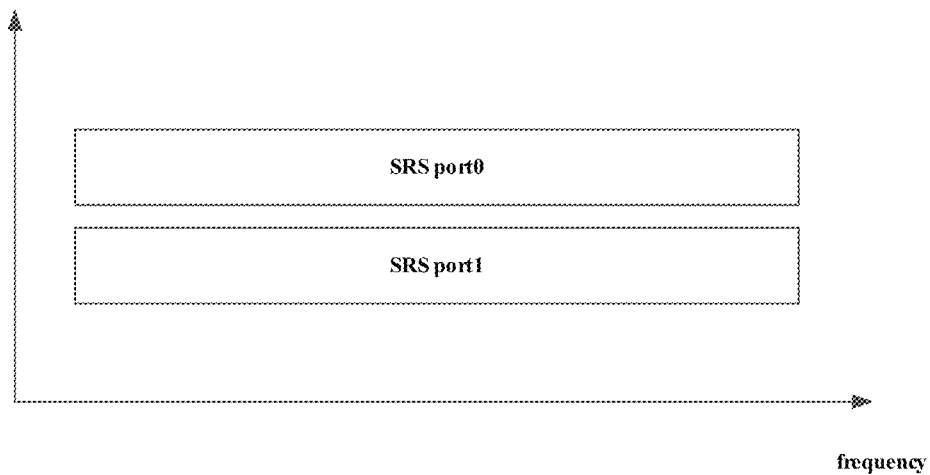
FIG. 8 is a schematic diagram of SRS resource allocation according to the embodiment of the present disclosure.

Optionally, the SRS resource allocation method is as follows:

(1) The resource allocation of SRS is irrelevant to the mapping from DMRS to SRS. For example, in the SRS resource allocation scheme in the related art, each SRS port is mapped to each PRB allocated by the network device for the SRS, as shown in FIG. 8.

Figure 9:
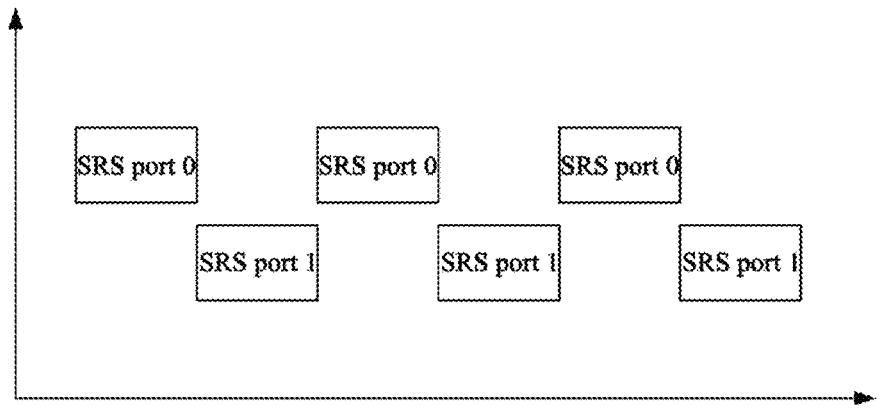
FIG. 9 is another schematic diagram of SRS resource allocation according to the embodiment of the present disclosure.

(2) An SRS port is only mapped on part of the bandwidth allocated by the network device for SRS. For example, an SRS port is only transmitted on its corresponding part of sub-bands (centralized subbands or distributed sub-bands). An example is shown in FIG. 9. Compared with the solution in the related art that each SRS port is sent in the full bandwidth, when the SRS is sent in a part of the bandwidth, the transmission power of the SRS can be increased. For example, assuming there are 4 SRS ports in total, if each SRS port is transmitted on the entire bandwidth allocated for the SRS, the transmission power of each SRS port in one RE is P/4 (P is a power value), when each ports only is only transmitted in ¼ bandwidth, the transmission power of each SRS port in one RE can be P.

The embodiment of the present disclosure also provides a first device. Since the principle of the terminal to solve the problem is similar to the data transmission method in the embodiment of the present disclosure, the implementation of the first device can refer to the implementation of the method, and the repetition will not be repeated.

Figure 10:
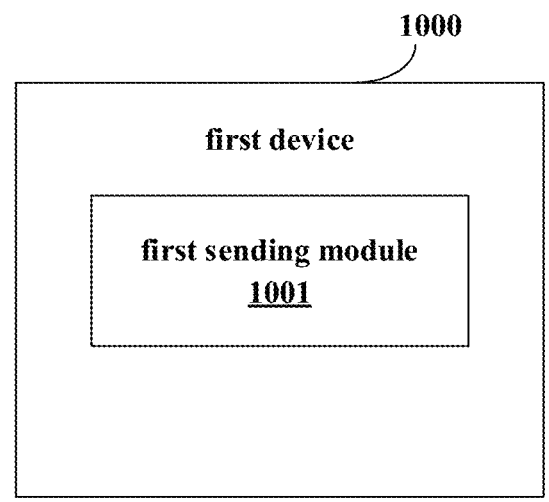
FIG. 10 is a schematic structural diagram of a first device according to an embodiment of the disclosure.

Referring to FIG. 10, an embodiment of the present disclosure further provides a first device, and the first device 1000 includes: a first sending module 1001, configured to send a first signal and a demodulation reference signal (DMRS) corresponding to the first signal to a second device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

In the embodiment of the present disclosure, optionally, different data streams in the first signal correspond to different DMRS ports.

In the embodiment of the present disclosure, optionally, the first sending module 1001 is further configured to: send the first signal to the second device according to the first transmission power Wherein, the first transmission power is determined by evenly distributing the transmission power of the first signal on all first signal ports corresponding to the transmission of the first signal.

In the embodiment of the present disclosure, optionally, the first device 1000 further includes a second sending module configured to send first information to the second device; the first information indicates that the first device has a capability to send the first signal with the maximum transmission power; and/or a capability to map the same DMRS port in different subbands to one or more of the following: different PAs, SRS ports, first signal ports.

Correspondingly, the first sending module 1101 is further configured to: send the first signal and the DMRS corresponding to the first signal to the second device according to the first information.

In the embodiment of the present disclosure, optionally, the first device 1000 further includes a first receiving module, configured to receive second information from the second device.

Correspondingly, the first sending module 1101 is further configured to send the first signal and the DMRS corresponding to the first signal to the second device according to the second information;

Wherein, the second information indicates at least one of the following:
  a first power control strategy used by the first device;
  the first device sending the first signal with the maximum transmission power;
  the first device mapping the same DMRS port to one of more of different PAs, SRS ports and/or first signal ports in different subbands;
  a first transmission mode used by the first device;
  a precoding matrix of the first signal being a codeword whose number of transmission streams is less than or equal to K, where K is an integer greater than or equal to 1;
  the number of transmission streams of the first signal being less than or equal to M, where M is an integer greater than or equal to 1;
  the precoding matrix of the first signal being a noncoherent codeword;
  the precoding matrix of the first signal being the partially coherent codeword;
  the precoding matrix of the first signal being the noncoherent codeword or a partially coherent codeword.

In the embodiment of the present disclosure, optionally, the first device 1000 further includes a second receiving module configured to receive third information from the second device, the third information indicating the correspondence between the DMRS port and the SRS port; or send the third information to the second device, where the third information indicates the correspondence between the DMRS port and the SRS port.

In the embodiment of the present disclosure, optionally, the first device 1000 further includes a first determining module configured to determine at least one of the following according to a first rule or according to signaling indicated by the network side:
  The precoding matrix used by the first signal and/or the DMRS port corresponding to the first signal in each subband in the frequency domain resource or the system bandwidth or the BWP where the first signal is scheduled;
  The PA used by the first signal and/or the DMRS port corresponding to the first signal in each subband in the frequency domain resource or the system bandwidth or the BWP where the first signal is scheduled;
  The SRS port corresponding to the first signal and/or the DMRS port corresponding to the first signal in each subband in the frequency domain resource or the system bandwidth or the BWP where the first signal is scheduled.

In the embodiment of the present disclosure, optionally, the first device 1000 further includes a third sending module configured to send signaling to the second device, the signaling indicating at least one of the following:
  The precoding matrix used by the first signal in each subband in the frequency domain resource or the system bandwidth or the BWP where the first signal is scheduled;
  The DMRS port corresponding to the first signal in each subband in the frequency domain resource or the system bandwidth or the BWP where the first signal is scheduled;
  The PA used by the first signal in each subband in the frequency domain resource or the system bandwidth or the BWP where the first signal is scheduled;
  The SRS port corresponding to the first signal in each subband in the frequency domain resource or the system bandwidth or the BWP where the first signal is scheduled;
  The PA used by the DMRS corresponding to the first signal in each subband in the frequency domain resource or the system bandwidth or the BWP where the first signal is scheduled;
  The SRS port corresponding to the DMRS port corresponding to the first signal in each subband in the frequency domain resource or the system bandwidth or the BWP where the first signal is scheduled.

In the embodiment of the present disclosure, optionally, the signaling may include:
  (1) A precoding matrix of one subband; or,
  (2) A plurality of precoding matrices, where the precoding matrices in the plurality of precoding matrices and subbands have a predefined correspondence relationship.

In the embodiment of the present disclosure, optionally, the subband used by the first signal is determined by at least one of the following methods:
  determining by division according to a quantity of subbands and resources allocated by the second device for the first signal, wherein the quantity of subbands is pre-agreed by the first device and the second device
  determining according to subband division in a system bandwidth or the BWP of the first signal and scheduling information of the first signal
  obtained by dividing resources allocated according to the first signal.

In the embodiment of the present disclosure, optionally, the system bandwidth or BWP of the first signal or the subband in the scheduled resource of the first signal is determined according to a predefined subband division mode.

In the embodiment of the present disclosure, optionally, the predefined subband division mode includes that: the system bandwidth or BWP for transmission of the first signal or the scheduled resource of the first signal includes S subbands, and the minimum unit of each subband is P consecutive PRBs. In one subband, a minimum unit appears every P*S PRBs, where the P is an integer greater than or equal to 1, the S is a positive integer, and the S is configured by the network side or agreed by a protocol.

In the embodiment of the present disclosure, optionally, the predefined subband division mode includes at least one of the following:
  (1) One or more DMRS ports correspond to one subband;
  (2) One DMRS port corresponds to one or more subbands.

In the embodiment of the present disclosure, optionally, different DMRS ports can only be transmitted on different subbands in the frequency domain resource, the system bandwidth, or the BWP where the first signal is scheduled.

In the embodiment of the present disclosure, optionally, the position offset of the subband in the frequency domain resource, the system bandwidth, or the BWP where the first signal corresponding to the DMRS port is scheduled is configured by the network side or agreed in a protocol.

In the embodiment of the present disclosure, optionally, the first device 1000 further includes a fourth sending module configured to send DMRS resource indication information to the second device, where the DMRS resource indication information indicates a frequency domain resource location of the DMRS port.

In the embodiment of the present disclosure, optionally, the first device 1000 further includes a second receiving module configured to: receive resource indication information of the first signal from the second device; determine the physical resource block PRB to which the DMRS is mapped according to the resource indication information of the first signal and the precoding of the first signal.

In the embodiment of the present disclosure, optionally, one DMRS port is mapped on a PRB with the data stream transmission corresponding to the DMRS port.

In the embodiment of the present disclosure, optionally, the first device 1000 further includes a third receiving module configured to receive DMRS resource indication information sent by the second device, where the DMRS resource indication information indicates the frequency domain resource location of the DMRS port; determine the frequency domain resource location of the DMRS corresponding to the first signal according to the DMRS resource indication information. In the embodiment of the present disclosure, optionally, the first sending module 1001 is further configured to: send a first signal to the second device through a first transmission mode, where the first transmission mode includes at least one of the following:

Each data stream of the first signal is transmitted on all PRBs of the transmission resource indicated by the second device for the first device;
  Each data stream of the first signal is only transmitted on a PRB where the DMRS port corresponding to the data stream is located.

In the embodiment of the present disclosure, optionally, the first device 1000 further includes a fourth receiving module configured to: receive resource indication information of the first signal from the second device; determine a transmission resource of the first signal according to the resource indication information.

Wherein, the resource indication information indicates at least one of the following:
  a resource allocation situation of the first signal in the entire bandwidth or BWP;
  a resource allocation situation of the first signal in a predefined subband;
  a resource allocation situation of the first signal in one or more subbands.

In the embodiment of the present disclosure, optionally, the resource allocation mode of the SRS port includes any one of the following:

The resource allocation of the SRS port is irrelevant to the mapping between the DMRS port and the SRS port;
  The SRS port is only mapped on a part of the subband.

In the embodiment of the present disclosure, optionally, the first signal performs rate matching based on the actual transmission condition of the DMRS port; and/or, the first signal performs rate matching based on the assumption that a DMRS port with data stream mapping exists in each PRB.

In the embodiment of the present disclosure, optionally, the first signal is an uplink signal, the first device is a terminal, and the second device is a network device; or, the first signal is a downlink signal, and the first device is the network device, and the second device is the terminal.

The first device provided in the embodiment of the present disclosure can execute the foregoing method embodiment, and its implementation principle and technical effect are similar, and details are not described herein again in this embodiment.

The embodiment of the present disclosure also provides a first device. Since the principle to solve the problem is similar to the data transmission method in the embodiment of the present disclosure, the implementation of the first device can refer to the implementation of the method, and the repetition will not be repeated.

Figure 11:
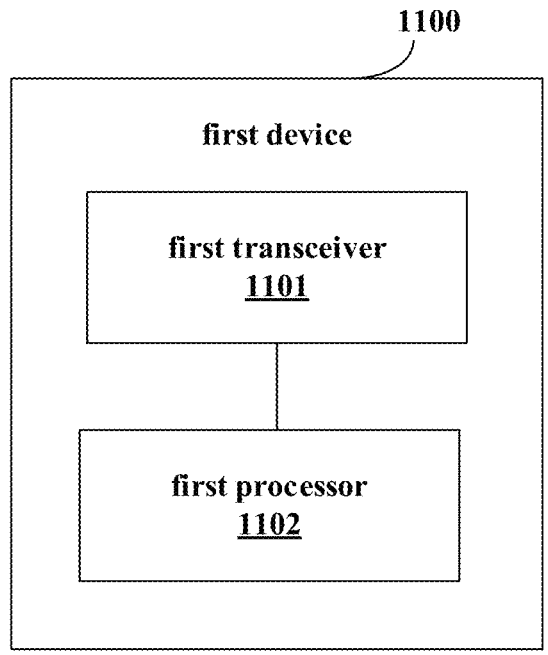
FIG. 11 is another schematic structural diagram of a first device according to an embodiment of the disclosure.

Referring to FIG. 11, an embodiment of the present disclosure further provides a first device. The first device 1100 includes: a first transceiver 1101 and a first processor 1102.

The first transceiver 1101 is configured to send a first signal and send a demodulation reference signal (DMRS) corresponding to the first signal to a second device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

In the embodiment of the present disclosure, optionally, different data streams in the first signal correspond to different DMRS ports.

In the embodiment of the present disclosure, optionally, the sending the first signal to the second device includes: sending the first signal to the second device according to first transmission power; Wherein, the first transmission power is determined by evenly distributing the transmission power of the first signal on all first signal ports corresponding to the transmission of the first signal.

In the embodiment of the present disclosure, optionally, in the embodiment of the present disclosure, optionally, the first transceiver 1101 is configured to: send first information to the second device; the first information indicates that the first device has a capability to send the first signal with the maximum transmission power; and/or a capability to map the same DMRS port in different subbands to one or more of the following: different PAs, SRS ports, first signal ports; send the first signal and the DMRS corresponding to the first signal to the second device.

In the embodiment of the present disclosure, optionally, the first transceiver 1101 is configured to: receive second information from the second device; send the first signal and the DMRS corresponding to the first signal to the second device according to the second information;

Wherein, the second information indicates at least one of the following:
  a first power control strategy used by the first device;
  the first device sending the first signal with the maximum transmission power;

the first device mapping the same DMRS port to one of more of different PAs, SRS ports and/or first signal ports in different subbands;

a first transmission mode used by the first device;

a precoding matrix of the first signal being a codeword whose number of transmission streams is less than or equal to K, where K is an integer greater than or equal to 1;

the number of transmission streams of the first signal being less than or equal to M, where M is an integer greater than or equal to 1;

the precoding matrix of the first signal being a noncoherent codeword;

the precoding matrix of the first signal being the partially coherent codeword;

the precoding matrix of the first signal being the noncoherent codeword or a partially coherent codeword.

In the embodiment of the present disclosure, optionally, the first transceiver 1101 is configured to: receive third information from the second device, the third information indicating the correspondence between the DMRS port and the SRS port; or send third information to the second device, where the third information indicates the correspondence between the DMRS port and the SRS port.

In the embodiment of the present disclosure, optionally, the first processor 1102 is configured to determine at least one of the following according to the first rule or according to the signaling indicated by the network side:

The precoding matrix used by the first signal and/or the DMRS port corresponding to the first signal in each subband in the frequency domain resource or the system bandwidth or the BWP where the first signal is scheduled;

The PA used by the first signal and/or the DMRS port corresponding to the first signal in each subband in the frequency domain resource or the system bandwidth or the BWP where the first signal is scheduled;

The SRS port corresponding to the first signal and/or the DMRS port corresponding to the first signal in each subband in the frequency domain resource or the system bandwidth or the BWP where the first signal is scheduled.

In the embodiment of the present disclosure, optionally, the first transceiver 1101 is configured to: send signaling to the second device, where the signaling indicates at least one of the following:

The precoding matrix used by the first signal in each subband in the frequency domain resource or the system bandwidth or the BWP where the first signal is scheduled;

The DMRS port corresponding to the first signal in each subband in the frequency domain resource or the system bandwidth or the BWP where the first signal is scheduled;

The PA used by the first signal in each subband in the frequency domain resource or the system bandwidth or the BWP where the first signal is scheduled;

The SRS port corresponding to the first signal in each subband in the frequency domain resource or the system bandwidth or the BWP where the first signal is scheduled;

The PA used by the DMRS corresponding to the first signal in each subband in the frequency domain resource or the system bandwidth or the BWP where the first signal is scheduled;

The SRS port corresponding to the DMRS port corresponding to the first signal in each subband in the frequency domain resource or the system bandwidth or the BWP where the first signal is scheduled.

In the embodiment of the present disclosure, optionally, the signaling includes: a precoding matrix of one subband; or a plurality of precoding matrices, where the precoding matrices in the plurality of precoding matrices and subbands have a predefined correspondence relationship.

In the embodiment of the present disclosure, optionally, the subband of the first signal is determined by at least one of the following methods:

determining by division according to a quantity of subbands and resources allocated by the second device for the first signal, wherein the quantity of subbands is pre-agreed by the first device and the second device determining according to subband division in a system bandwidth or the BWP of the first signal and scheduling information of the first signal obtained by dividing resources allocated according to the first signal.

In the embodiment of the present disclosure, optionally, the system bandwidth or BWP of the first signal or the subband in the scheduled resource of the first signal is determined according to a predefined subband division mode.

In the embodiment of the present disclosure, optionally, the predefined subband division mode includes:

In the embodiment of the present disclosure, optionally, the predefined subband division mode includes that: the system bandwidth or BWP for transmission of the first signal or the scheduled resource of the first signal includes S subbands, and the minimum unit of each subband is P consecutive PRBs. In one subband, a minimum unit appears every P*S PRBs, where the P is an integer greater than or equal to 1, the S is a positive integer, and the S is configured by the network side or agreed by a protocol.

In the embodiment of the present disclosure, optionally, the predefined subband division mode includes at least one of the following:

One or more DMRS ports correspond to one subband;

One DMRS port corresponds to one or more subbands.

In the embodiment of the present disclosure, optionally, different DMRS ports can only be transmitted on different subbands in the frequency domain resource, the system bandwidth, or the BWP where the first signal is scheduled.

In the embodiment of the present disclosure, optionally, the position offset of the subband in the frequency domain resource, the system bandwidth, or the BWP where the first signal corresponding to the DMRS port is scheduled is configured by the network side or agreed in a protocol.

In the embodiment of the present disclosure, optionally, the first transceiver 1101 is configured to send DMRS resource indication information to the second device, where the DMRS resource indication information indicates a frequency domain resource location of the DMRS port.

In the embodiment of the present disclosure, optionally, the first transceiver 1101 is configured to: receive resource indication information of the first signal from the second device; determine the physical resource block PRB to which the DMRS is mapped according to the resource indication information of the first signal and the precoding of the first signal.

In the embodiment of the present disclosure, optionally, one DMRS port is mapped on a PRB with the data stream transmission corresponding to the DMRS port.

In the embodiment of the present disclosure, optionally, the first transceiver 1101 is configured to: receive DMRS resource indication information sent by the second device, where the DMRS resource indication information indicates the frequency domain resource location of the DMRS port; determine the frequency domain resource location of the DMRS corresponding to the first signal according to the DMRS resource indication information.

In the embodiment of the present disclosure, optionally, the first transceiver 1101 is configured to: send a first signal to the second device through a first transmission mode, where the first transmission mode includes at least one of the following:

Each data stream of the first signal is transmitted on all PRBs of the transmission resource indicated by the second device for the first device;

Each data stream of the first signal is only transmitted on a PRB where the DMRS port corresponding to the data stream is located.

In the embodiment of the present disclosure, optionally, the first transceiver 1101 is configured to: receive resource indication information of the first signal from the second device; determine a transmission resource of the first signal according to the resource indication information.

Wherein, the resource indication information indicates at least one of the following:
 a resource allocation situation of the first signal in the entire bandwidth or BWP;
 a resource allocation situation of the first signal in a predefined subband;
 a resource allocation situation of the first signal in one or more subbands.

In the embodiment of the present disclosure, optionally, the resource allocation mode of the SRS port includes any one of the following:

The resource allocation of the SRS port is irrelevant to the mapping between the DMRS port and the SRS port;

The SRS port is only mapped on a part of the subband.

In the embodiment of the present disclosure, optionally, the first signal performs rate matching based on the actual transmission condition of the DMRS port; and/or, the first signal performs rate matching based on the assumption that a DMRS port with data stream mapping exists in each PRB.

In the embodiment of the present disclosure, optionally, the first signal is an uplink signal, the first device is a terminal, and the second device is a network device; or, the first signal is a downlink signal, and the first device is the network device, and the second device is the terminal.

The first device provided in the embodiment of the present disclosure can perform the foregoing method embodiment, and its implementation principle and technical effect are similar, and details are not described herein again in this embodiment.

The embodiment of the present disclosure also provides a second device. Since the principle of the terminal to solve the problem is similar to the data transmission method in the embodiment of the present disclosure, the implementation of the second device can refer to the implementation of the method, and the repetition will not be repeated.

Figure 12:
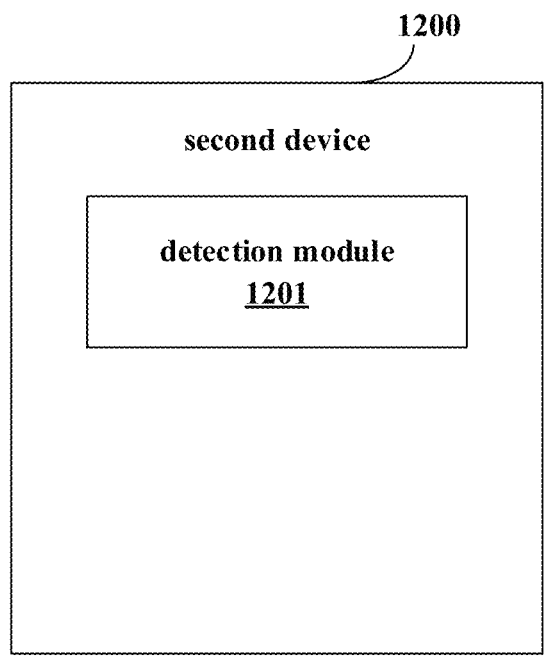
FIG. 12 is a schematic structural diagram of a second device according to an embodiment of the present disclosure.

Referring to FIG. 12, an embodiment of the present disclosure further provides a second device, and the second device 1200 includes: a detection module 1201, configured to detect a first signal and DMRS corresponding to the first signal sent by a first device; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

In the embodiment of the present disclosure, optionally, the second device 1200 further includes a channel estimation module, configured to separately perform channel estimation on the same DMRS port and/or the first signal in different subbands.

In the embodiment of the present disclosure, optionally, the second device 1200 further includes a subband dividing module, configured to divide the scheduling bandwidth of the first signal into N subbands when scheduling the first signal, and calculate signal to interference and noise ratios of different subbands based on different SRS ports and/or different precoding matrices, N is an integer greater than 1.

In the embodiment of the present disclosure, optionally, the second device 1200 further includes a fifth receiving module configured to receive fourth information from the first device, where the fourth information indicates at least one of the following:

The coherent transmission capability of the first device;

The capability of the first device to transmit the first signal with the maximum transmission power.

The first device has the capability to map the same DMRS port to different PAs, SRS ports, and/or first signal ports in different subbands.

In an embodiment of the present disclosure, optionally, the second device 1200 further includes a sixth receiving module configured to: receive first information from the first device, the first information indicating that the first device has the capability to transmit the first signal with maximum transmission power; and/or the first device has the capability to map the same DMRS port to one or more of the following in different subbands: different PAs, SRS ports, and first signal ports.

In the embodiment of the present disclosure, optionally, the second device 1200 further includes a fifth sending module configured to send second information to the first device, where the second information indicates at least one of the following:
 a first power control strategy used by the first device;
 the first device sending the first signal and the DMRS corresponding to the first signal by using the maximum transmission power;
 a first device mapping the same DMRS port to one or more of different PA, SRS ports and/or first signal ports in different subbands;
 the first transmission mode used by the first device;
 the precoding matrix of the first signal being a codeword whose number of transmission streams is less than or equal to K, where K is an integer greater than or equal to 1;
 the number of transmission streams of the first signal being less than or equal to M, where M is an integer greater than or equal to 1;
 the precoding matrix of the first signal being a non-coherent codeword;
 the precoding matrix of the first signal being a partially coherent codeword;
 the precoding matrix of the first signal being a non-coherent codeword or a partially coherent codeword.

In the embodiment of the present disclosure, optionally, the second device 1200 further includes a sixth sending module configured to send third information to the first device, the third information indicating the correspondence between the DMRS port and the SRS port.

In the embodiment of the present disclosure, optionally, the second device 1200 further includes a seventh sending module configured to send signaling to the first device, and the signaling is used by the first device to determine at least one of the following:

a precoding matrix used by the first signal and/or the DMRS port corresponding to the first signal in each subband in the frequency domain resource or the system bandwidth or the BWP where the first signal is scheduled;

a PA used by the first signal and/or the DMRS port corresponding to the first signal in each subband in the frequency domain resource or the system bandwidth or the BWP where the first signal is scheduled;

a SRS port corresponding to the first signal and/or the DMRS port corresponding to the first signal in each subband in the frequency domain resource or the system bandwidth or the BWP where the first signal is scheduled.

In the embodiment of the present disclosure, optionally, the second device 1200 further includes a seventh receiving module configured to receive signaling from the first device, the signaling indicating at least one of the following:

The precoding matrix used by the first signal in each subband in the frequency domain resource or the system bandwidth or the BWP where the first signal is scheduled;

The DMRS port corresponding to the first signal in each subband in the frequency domain resource or the system bandwidth or the BWP where the first signal is scheduled;

The PA used by the first signal in each subband in the frequency domain resource or the system bandwidth or the BWP where the first signal is scheduled;

The SRS port corresponding to the first signal in each subband in the frequency domain resource or the system bandwidth or the BWP where the first signal is scheduled.

The PA used by the DMRS corresponding to the first signal in each subband in the frequency domain resource or the system bandwidth or the BWP where the first signal is scheduled;

The SRS port corresponding to the DMRS port corresponding to the first signal in each subband in the frequency domain resource or the system bandwidth or the BWP where the first signal is scheduled.

In the embodiment of the present disclosure, optionally, the signaling includes: a precoding matrix for one subband; or a plurality of precoding matrices, where precoding matrices in the plurality of precoding matrices and subbands have a predefined correspondence relationship.

In the embodiment of the present disclosure, optionally, the subband of the first signal is determined by at least one of the following methods:

determining by division according to a quantity of subbands and resources allocated by the second device for the first signal, wherein the quantity of subbands is pre-agreed by the first device and the second device;

determining according to subband division in a system bandwidth or the BWP of the first signal and scheduling information of the first signal;

obtained by division of the resources allocated for the first signal.

In the embodiment of the present disclosure, optionally, the subband in the system bandwidth or bandwidth portion of the first signal or in the scheduled resource of the first signal is determined according to a predefined subband division mode.

In the embodiment of the present disclosure, optionally, the predefined subband division mode includes:

The system bandwidth or BWP of the first signal or the scheduled resource of the first signal includes S subbands, and the minimum unit of each subband is P consecutive PRBs. In one subband, a minimum unit appears every P*S PRBs, where the P is an integer greater than or equal to 1, the S is a positive integer, and the S is configured by the network side or agreed by a protocol.

In the embodiment of the present disclosure, optionally, the predefined subband division mode includes at least one of the following:

One or more DMRS ports correspond to one subband;

One DMRS port corresponds to one or more subbands.

In the embodiment of the present disclosure, optionally, the second device further includes a second determining module, configured to: determine determining position offset of the subband in the frequency domain resource or the system bandwidth or the BWP in which the first signal is scheduled according to the instruction information of the first device or a protocol agreement.

In the embodiment of the present disclosure, optionally, the second device further includes an eighth sending module configured to send resource indication information to the first device; wherein the resource indication information indicates at least one of:

a resource allocation situation of the first signal in the entire bandwidth or BWP;

a resource allocation situation of the first signal in a predefined subband;

a resource allocation situation of the first signal in one or more subbands.

In the embodiment of the present disclosure, optionally, the second device further includes a third determining module configured to: determine the PRB to which the DMRS is mapped according to the resource indication information of the first signal sent by the first device and the precoding of the first signal.

In the embodiment of the present disclosure, optionally, the second device further includes a ninth sending module configured to send DMRS resource indication information to the first device, where the DMRS resource indication information indicates the frequency domain resource location of the DMRS port.

In the embodiment of the present disclosure, optionally, the resource allocation mode of the SRS port includes at least one of the following:

The resource allocation of the SRS port is irrelevant to the mapping between the DMRS port and the SRS port;

The SRS port is only mapped on a part of the bandwidth allocated by the second device for the SRS port.

In the embodiment of the present disclosure, optionally, the detection module is further configured to: detect the first signal sent by the first device on all PRBs of the transmission resources indicated by the second device for the first device; or detect the first signal sent by the first device on all PRBs of the transmission resources indicated by the first device for the second device; or, detect the first signal sent by the first device on a PRB where the DMRS port corresponding to each data stream of the first signal is located.

In the embodiment of the present disclosure, optionally, the first signal is an uplink signal, the first device is a terminal, and the second device is a network device; or, the first signal is a downlink signal, and the first device is the network device, and the second device is the terminal.

The second device provided in the embodiment of the present disclosure can execute the foregoing method embodiment, and its implementation principles and technical effects are similar, and details are not described herein again in this embodiment.

The embodiment of the present disclosure also provides a second device. Since the principle of the terminal to solve the problem is similar to the data transmission method in the embodiment of the present disclosure, the implementation of the second device can refer to the implementation of the method, and the repetition will not be repeated.

Figure 13:
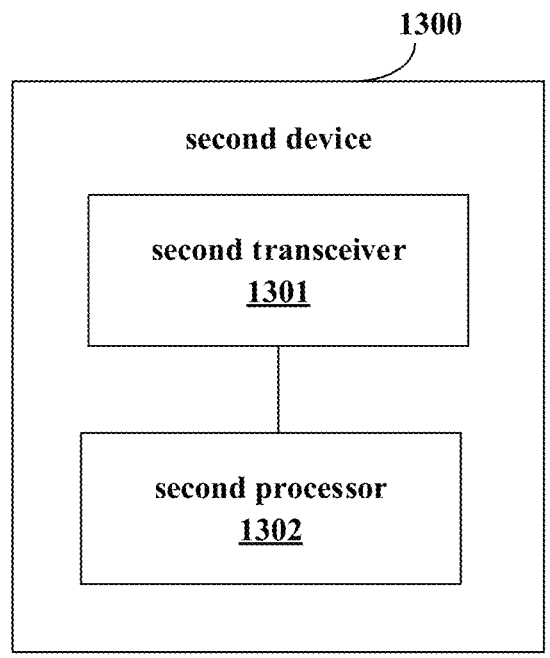
FIG. 13 is another schematic structural diagram of a second device according to an embodiment of the disclosure.

Referring to FIG. 13, an embodiment of the present disclosure further provides a second device. The second device 1300 includes: a second transceiver 1301 and a second processor 1302.

The second processor 1302 is configured to detect a first signal sent by a first device and DMRS corresponding to the first signal; wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports.

In the embodiment of the present disclosure, optionally, the second processor 1302 is configured to separately perform channel estimation on the same DMRS port and/or the first signal in different subbands.

In the embodiment of the present disclosure, optionally, the second processor 1302 is configured to: divide the scheduling bandwidth of the first signal into N subbands when scheduling the first signal, and calculate signal to interference and noise ratios of different subbands based on different SRS ports and/or different precoding matrices, N is an integer greater than 1.

In the embodiment of the present disclosure, optionally, the second transceiver 1301 is configured to: receive fourth information from the first device, where the fourth information indicates at least one of the following:

The coherent transmission capability of the first device;

The capability of the first device to transmit the first signal with the maximum transmission power.

The first device has the capability to map the same DMRS port to different PAs, SRS ports, and/or first signal ports in different subbands.

In the embodiment of the present disclosure, optionally, the second transceiver 1301 is configured to: receive first information from the first device, the first information indicating that the first device has the capability to transmit the first signal with maximum transmission power; and/or the first device has the capability to map the same DMRS port to one or more of the following in different subbands: different PAs, SRS ports, and first signal ports.

In the embodiment of the present disclosure, optionally, the second transceiver 1301 is configured to: send second information to the first device, where the second information indicates at least one of the following:

a first power control strategy used by the first device;

the first device sending the first signal and the DMRS corresponding to the first signal by using the maximum transmission power;

a first device mapping the same DMRS port to one or more of different PA, SRS ports and/or first signal ports in different subbands;

the first transmission mode used by the first device;

the precoding matrix of the first signal being a codeword whose number of transmission streams is less than or equal to K, where K is an integer greater than or equal to 1;

the number of transmission streams of the first signal being less than or equal to M, where M is an integer greater than or equal to 1;

the precoding matrix of the first signal being a non-coherent codeword;

the precoding matrix of the first signal being a partially coherent codeword;

the precoding matrix of the first signal being a non-coherent codeword or a partially coherent codeword.

In the embodiment of the present disclosure, optionally, the second transceiver 1301 is configured to send third information to the first device, the third information indicating the correspondence between the DMRS port and the SRS port.

In the embodiment of the present disclosure, optionally, the second transceiver 1301 is configured to: send signaling to the first device, and the signaling is used by the first device to determine at least one of the following:

The precoding matrix used by the first signal in each subband in the frequency domain resource or the system bandwidth or the BWP where the first signal is scheduled;

The PA used by the first signal in each subband in the frequency domain resource or the system bandwidth or the BWP where the first signal is scheduled;

The SRS port corresponding to the first signal in each subband in the frequency domain resource or the system bandwidth or the BWP where the first signal is scheduled.

In the embodiment of the present disclosure, optionally, the second transceiver 1301 is configured to: receive signaling from the first device, the signaling indicating at least one of the following:

The precoding matrix used by the first signal in each subband in the frequency domain resource or the system bandwidth or the BWP where the first signal is scheduled;

The DMRS port corresponding to the first signal in each subband in the frequency domain resource or the system bandwidth or the BWP where the first signal is scheduled;

The PA used by the first signal in each subband in the frequency domain resource or the system bandwidth or the BWP where the first signal is scheduled;

The SRS port corresponding to the first signal in each subband in the frequency domain resource or the system bandwidth or the BWP where the first signal is scheduled.

The PA used by the DMRS corresponding to the first signal in each subband in the frequency domain resource or the system bandwidth or the BWP where the first signal is scheduled;

The SRS port corresponding to the DMRS port corresponding to the first signal in each subband in the frequency domain resource or the system bandwidth or the BWP where the first signal is scheduled.

In the embodiment of the present disclosure, optionally, the signaling includes: a precoding matrix for one subband; or a plurality of precoding matrices, where precoding matrices in the plurality of precoding matrices and subbands have a predefined correspondence relationship.

In the embodiment of the present disclosure, optionally, the subband of the first signal is determined by at least one of the following methods:

determining by division according to a quantity of subbands and resources allocated by the second device for the first signal, wherein the quantity of subbands is pre-agreed by the first device and the second device;

determining according to subband division in a system bandwidth or the BWP of the first signal and scheduling information of the first signal;

obtained by division of the resources allocated for the first signal.

In the embodiment of the present disclosure, optionally, the subband in the system bandwidth or bandwidth portion of the first signal or in the scheduled resource of the first signal is determined according to a predefined subband division mode.

In the embodiment of the present disclosure, optionally, the predefined subband division mode includes:

The system bandwidth or BWP of the first signal or the scheduled resource of the first signal includes S subbands, and the minimum unit of each subband is P consecutive PRBs. In one subband, a minimum unit appears every P*S PRBs, where the P is an integer greater than or equal to 1, the S is a positive integer, and the S is configured by the network side or agreed by a protocol.

In the embodiment of the present disclosure, optionally, the predefined subband division mode includes at least one of the following:

One or more DMRS ports correspond to one subband;
One DMRS port corresponds to one or more subbands.

In the embodiment of the present disclosure, optionally, the second processor 1302 is configured to: determine determining position offset of the subband in the frequency domain resource or the system bandwidth or the BWP in which the first signal is scheduled according to the instruction information of the first device or a protocol agreement.

In the embodiment of the present disclosure, optionally, the second transceiver 1301 is configured to: send resource indication information to the first device; wherein the resource indication information indicates at least one of:
 a resource allocation situation of the first signal in the entire bandwidth or BWP;
 a resource allocation situation of the first signal in a predefined subband;
 a resource allocation situation of the first signal in one or more subbands.

In the embodiment of the present disclosure, optionally, the second processor 1302 is configured to: determine the PRB to which the DMRS is mapped according to the resource indication information of the first signal sent by the first device and the precoding of the first signal.

In the embodiment of the present disclosure, optionally, the second transceiver 1301 is configured to send DMRS resource indication information to the first device, where the DMRS resource indication information indicates the frequency domain resource location of the DMRS port.

In the embodiment of the present disclosure, optionally, the resource allocation mode of the SRS port includes at least one of the following:

The resource allocation of the SRS port is irrelevant to the mapping between the DMRS port and the SRS port;
The SRS port is only mapped on a part of the bandwidth allocated by the second device for the SRS port.

In the embodiment of the present disclosure, optionally, the second processor 1302 is configured to: detect the first signal sent by the first device on all PRBs of the transmission resources indicated by the second device for the first device; or detect the first signal sent by the first device on all PRBs of the transmission resources indicated by the first device for the second device; or, detect the first signal sent by the first device on a PRB where the DMRS port corresponding to each data stream of the first signal is located.

In the embodiment of the present disclosure, optionally, the first signal is an uplink signal, the first device is a terminal, and the second device is a network device; or, the first signal is a downlink signal, and the first device is the network device, and the second device is the terminal.

The second device provided in the embodiment of the present disclosure can perform the foregoing method embodiment, and its implementation principles and technical effects are similar, and details are not described herein again in this embodiment.

Figure 14:
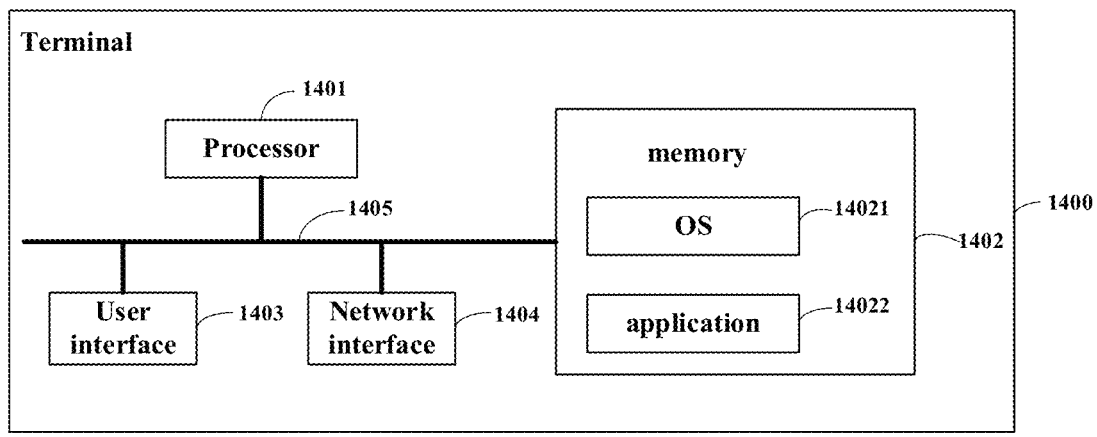
FIG. 14 is a schematic structural diagram of a terminal according to an embodiment of the present disclosure.

As shown in FIG. 14, the terminal 1400 shown in FIG. 14 includes: at least one processor 1401, a memory 1402, at least one network interface 1404, and a user interface 1403. The various components in the terminal 1300 are coupled together through the bus system 1405. It can be understood that the bus system 1405 is used to implement connection and communication between these components. In addition to the data bus, the bus system 1405 also includes a power bus, a control bus, and a status signal bus. However, for the sake of clarity, various buses are marked as the bus system 1405 in FIG. 14.

The user interface 1403 may include a display, a keyboard, or a pointing device (for example, a mouse, a trackball, a touch panel, or a touch screen, etc.).

It can be understood that the memory 1402 in the embodiment of the present disclosure may be a volatile memory or a non-volatile memory, or may include both volatile and non-volatile memory. Among them, the non-volatile memory can be read-only memory (ROM), programmable read-only memory (Programmable ROM, PROM), erasable programmable read-only memory (Erasable PROM, EPROM), and electrically available Erase programmable read-only memory (Electrically EPROM, EEPROM) or flash memory. The volatile memory may be a random access memory (RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), Double Data rate SDRAM (DDRSDRAM), Enhanced Synchronous Dynamic Random Access Memory (Enhanced SDRAM, ESDRAM), Synchronous Link Dynamic Random Access Memory (Synchlink DRAM, SLDRAM) and Direct Rambus RAM (DRRAM). The memory 1402 of the system and method described in the embodiments of the present disclosure is intended to include, but is not limited to, these and any other suitable types of memory.

In some embodiments, the memory 1402 stores the following elements, executable modules or data structures, or a subset of them, or an extended set thereof: the operating system 14021 and the application 14022.

Among them, the operating system 14021 includes various system programs, such as a framework layer, a core library layer, a driver layer, etc., for implementing various basic services and processing hardware-based tasks. The application 14022 includes various application programs, such as a media player, a browser, etc., which are used to implement various application services. A program that implements the method of the embodiments of the present disclosure may be included in the application program 14022.

In an embodiment of the present disclosure, by calling a program or instruction stored in the memory 1402, specifically, a program or instruction stored in the application program 14022, the steps in the above data transmission method are implemented.

The terminal provided in the embodiment of the present disclosure can execute the foregoing method embodiment, and its implementation principles and technical effects are similar, and details are not described herein again in this embodiment.

Figure 15:
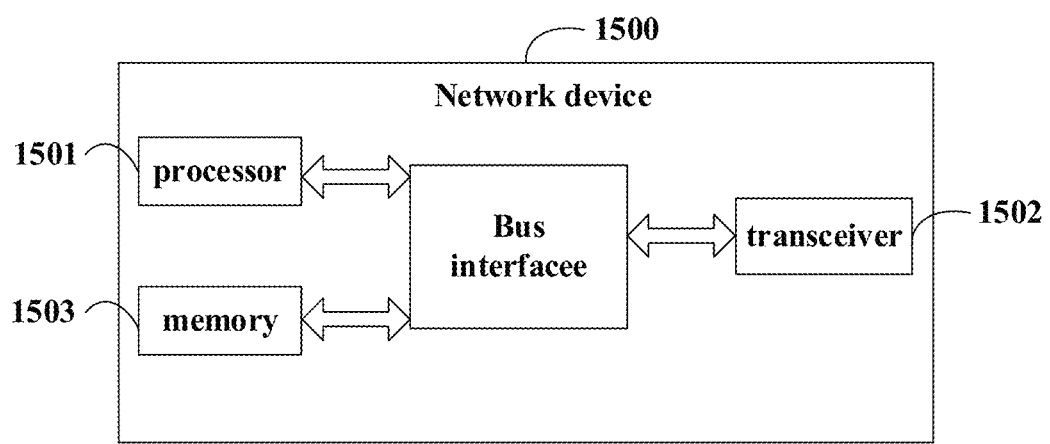
FIG. 15 is a schematic structural diagram of a network device according to an embodiment of the present disclosure.

FIG. 15 is a structural diagram of a network device applied in an embodiment of the present disclosure. As shown in FIG. 15, the network device 1500 includes: a processor 1501, a transceiver 1502, a memory 1503, and a bus interface, where:

In an embodiment of the present disclosure, the network device 1500 further includes a program that is stored in the memory 1503 and can run on the processor 1501, and the program is executed by the processor 1501 to implement the steps in the foregoing method embodiment.

In FIG. 15, the bus architecture may include any number of interconnected buses and bridges. Specifically, various circuits of one or more processors represented by the processor 1501 and the memory represented by the memory 1503 are linked together. The bus architecture can also link various other circuits such as peripheral devices, voltage regulators, power management circuits, etc., which are all known in the art, and therefore, no further description will be given herein. The bus interface provides the interface. The transceiver 1502 may be a plurality of elements, that is, including a transmitter and a receiver, and provide a unit for communicating with various other devices on the transmission medium.

The processor 1501 is responsible for managing the bus architecture and general processing, and the memory 1503 can store data used by the processor 1501 when performing operations.

The network device provided by the embodiment of the present disclosure can execute the foregoing method embodiment, and its implementation principles and technical effects are similar, and details are not described herein again in this embodiment.

The steps of the method or algorithm described in connection with the disclosure of the present disclosure may be implemented in a hardware manner, or may be implemented in a manner in which a processor executes software instructions. The software instructions can be composed of corresponding software modules, and the software modules can be stored in RAM, flash memory, ROM, EPROM, EEPROM, registers, hard disks, mobile hard disks, read-only optical disks, or any other form of storage medium known in the art. An exemplary storage medium is coupled to the processor, so that the processor can read information from the storage medium and can write information to the storage medium. Of course, the storage medium may also be an integral part of the processor. The processor and the storage medium may be located in the ASIC. In addition, the ASIC may be located in the core network interface device. Of course, the processor and the storage medium may also exist as discrete components in the core network interface device.

Those skilled in the art should be aware that in one or more of the above examples, the functions described in the present disclosure can be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

The specific embodiments described above further describe the purpose, technical solutions, and beneficial effects of the present disclosure in further detail. It should be understood that the above descriptions are only specific embodiments of the present disclosure, and are not intended to limit the present disclosure. The protection scope, any modification, equivalent replacement, improvement, etc. made on the basis of the technical solution of the present disclosure shall be included in the protection scope of the present disclosure.

Those skilled in the art should understand that the embodiments of the present disclosure can be provided as a method, a system, or a computer program product. Therefore, the embodiments of the present disclosure may adopt the form of a complete hardware embodiment, a complete software embodiment, or an embodiment combining software and hardware. Moreover, the embodiments of the present disclosure may adopt the form of a computer program product implemented on one or more computer-usable storage medium (including but not limited to disk storage, CD-ROM, optical storage, etc.) storing computer-usable program codes.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment generates a device that realizes the functions specified in one process or a plurality of processes in the flowchart and/or one block or a plurality of blocks in the block diagram.

These computer program instructions can also be stored in a computer-readable memory that can direct a computer or other programmable data processing equipment to work in a specific manner, so that the instructions stored in the computer-readable memory produce an article of manufacture including the instruction device. The device implements the functions specified in one process or a plurality of processes in the flowchart and/or one block or a plurality of blocks in the block diagram.

These computer program instructions can also be loaded on a computer or other programmable data processing equipment, so that a series of operation steps are executed on the computer or other programmable equipment to produce computer-implemented processing, so as to execute on the computer or other programmable equipment steps for implementing functions specified in a flow or a plurality of flows in the flowchart and/or a block or a plurality of blocks in the block diagram.

Obviously, those skilled in the art can make various changes and modifications to the embodiments of the present disclosure without departing from the spirit and scope of the present disclosure. In this way, if these modifications and variations of the embodiments of the present disclosure fall within the scope of the claims of the present disclosure and their equivalent technologies, the present disclosure is also intended to include these modifications and variations.

What is claimed is:

1. A data transmission method applied to a first device, comprising:
sending a first signal and a demodulation reference signal (DMRS) corresponding to the first signal to a second device;

wherein the first signal includes at least one data stream, and each data stream corresponds to one DMRS port, one DMRS port corresponds to one or more of the following in different subbands: different power amplifiers (PAs), different sounding reference signal (SRS) ports, or different first signal ports;

wherein the first signal comprises at least one of: PUSCH, PUCCH, PDSCH, PDCCH.

2. The method according to claim 1, further comprising:
sending first information to the second device; wherein the first information indicates that the first device has a capability to send the first signal with the maximum transmission power; and/or wherein the first information indicates that the first device has a capability to map the same DMRS port to one or more of the following: different PAs, different SRS ports, different first signal ports in different subbands;

the sending a first signal and a demodulation reference signal (DMRS) corresponding to the first signal to a second device includes:

sending the first signal and the DMRS corresponding to the first signal to the second device according to the first information.

3. The method according to claim 1, further comprising:
receiving second information from the second device;
the sending a first signal and a demodulation reference signal (DMRS) corresponding to the first signal to a second device includes:

sending the first signal and the DMRS corresponding to the first signal to the second device according to the second information;

wherein the second information indicates at least one of the following:

a first power control strategy used by the first device;
the first device sending the first signal with the maximum transmission power;
the first device mapping a same DMRS port to one of more of different PAs, different SRS ports and/or different first signal ports in different subbands;
the first device mapping a same data stream of the first signal to one of more of different PAs, different SRS ports and/or different first signal ports in different subbands;
a first transmission mode used by the first device;
a precoding matrix of the first signal being a codeword whose number of transmission streams is less than or equal to K, where K is an integer greater than or equal to 1;
a number of transmission streams of the first signal being less than or equal to M, where M is an integer greater than or equal to 1;
the precoding matrix of the first signal being a noncoherent codeword;
the precoding matrix of the first signal being a partially coherent codeword;
the precoding matrix of the first signal being the noncoherent codeword or the partially coherent codeword.

4. The method according to claim 1, further comprising:
receiving third information from the second device, the third information indicating correspondence between the DMRS port and the SRS port; or
sending the third information to the second device, where the third information indicates the correspondence between the DMRS port and the SRS port; or
sending signaling to the second device, the signaling indicating at least one of the following:

a precoding matrix used by the first signal in each subband in the frequency domain resource or the system bandwidth or Bandwidth Part (BWP) where the first signal is scheduled;

a DMRS port corresponding to the first signal in each subband in the frequency domain resource or the system bandwidth or the BWP where the first signal is scheduled;

a PA used by the first signal in each subband in the frequency domain resource or the system bandwidth or the BWP where the first signal is scheduled;

a SRS port corresponding to the first signal in each subband in the frequency domain resource or the system bandwidth or the BWP where the first signal is scheduled;

a PA used by the DMRS corresponding to the first signal in each subband in the frequency domain resource or the system bandwidth or the BWP where the first signal is scheduled;

a SRS port corresponding to the DMRS port corresponding to the first signal in each subband in the frequency domain resource or the system bandwidth or the BWP where the first signal is scheduled.

5. The method according to claim 1, further comprising:
determining at least one of the following according to a first rule or according to signaling indicated by a second device:

a precoding matrix used by the first signal and/or the DMRS port corresponding to the first signal in each subband in the frequency domain resource or the system bandwidth or the BWP where the first signal is scheduled;

a PA used by the first signal and/or the DMRS port corresponding to the first signal in each subband in the frequency domain resource or the system bandwidth or the BWP where the first signal is scheduled;

a SRS port corresponding to the first signal and/or the DMRS port corresponding to the first signal in each subband in the frequency domain resource or the system bandwidth or the BWP where the first signal is scheduled.

6. The method according to claim 5, wherein the signaling comprises:
a precoding matrix of one subband, or,
a plurality of precoding matrices, wherein precoding matrices in the plurality of precoding matrices and subbands have a predefined correspondence relationship.

7. The method according to claim 1, wherein the subband of the first signal is determined by at least one of the following:

determining by division according to a quantity of subbands and resources allocated by the second device for the first signal, wherein the quantity of subbands is pre-agreed by the first device and the second device;

determining according to subband division in a system bandwidth or the BWP of the first signal and scheduling information of the first signal;

obtained by division of the resources allocated for the first signal.

8. The method according to claim 1, wherein the system bandwidth or Bandwidth Part (BWP) of the first signal or the subband in the scheduled resource of the first signal is determined according to a predefined subband division mode, wherein the predefined subband division mode includes:

the system bandwidth or BWP of the first signal or the scheduled resource of the first signal includes S subbands, and a minimum unit of each subband is P consecutive Physical Resource Blocks (PRBs), in one subband, the minimum unit appears every P*S PRBs, wherein the P is an integer greater than or equal to 1, the S is a positive integer, and the S is configured by the network side or agreed by a protocol.

9. The method according to claim 1, wherein different DMRS ports are only transmitted on different subbands in the frequency domain resource, the system bandwidth, or the BWP where the first signal is scheduled.

10. The method according to claim 1, wherein a position offset of the subband in the frequency domain resource, the system bandwidth, or the BWP where the first signal corresponding to the DMRS port is scheduled is configured by the network side or agreed in a protocol.

11. The method according to claim 1, further comprising:
sending DMRS resource indication information to the second device, wherein the DMRS resource indication information indicates a frequency domain resource location of the DMRS port; and/or
sending subband resource indication information to the second device, wherein the subband resource indication information indicates a frequency domain resource location of the subband.

12. The method according to claim 1, further comprising:
receiving resource indication information of the first signal from the second device;
determining a physical resource block (PRB) to which the DMRS is mapped according to the resource indication information of the first signal and precoding of the first signal.

13. The method according to claim 1, further comprising:
receiving DMRS resource indication information and/or subband resource indication information sent by the second device, wherein the DMRS resource indication information indicates a frequency domain resource location of the DMRS port, the subband resource indication information indicates a frequency domain resource location of the subband;
determining the frequency domain resource location of the DMRS corresponding to the first signal according to the DMRS resource indication information and the subband resource indication information.

14. The method according to claim 1, wherein the sending a first signal to the second device comprises:
sending the first signal to the second device through a first transmission mode, wherein the first transmission mode includes at least one of the following:
each data stream of the first signal being transmitted on all PRBs of the transmission resource indicated by the second device for the first device;
each data stream of the first signal being only transmitted on a PRB where the DMRS port corresponding to the data stream is located.

15. The method according to claim 1, wherein the first signal performs rate matching based on an actual transmission condition of the DMRS port, and/or
the first signal performs rate matching based on an assumption that a DMRS port with data stream mapping exists in each PRB.

16. A data transmission method applied to a second device, comprising:
detecting a first signal and DMRS corresponding to the first signal sent by a first device;

wherein, the first signal includes at least one data stream, and each data stream corresponds to one DMRS port, one DMRS port corresponds to one or more of the following in different subbands: different power amplifiers (PAs), different sounding reference signal (SRS) ports, or different first signal ports;
wherein the first signal comprises at least one of: PUSCH, PUCCH, PDSCH, PDCCH.

17. The method according to claim 16, further comprising:
receiving first information from the first device, the first information indicating that the first device has the capability to transmit the first signal with maximum transmission power; and/or
the first device has a capability to map the same DMRS port to one or more of the following in different subbands: different PAs, different SRS ports, and different first signal ports.

18. The method according to claim 16, further comprising:
sending second information to the first device, wherein the second information indicates at least one of the following:
a first power control strategy used by the first device;
the first device sending the first signal and the DMRS corresponding to the first signal with the maximum transmission power;
a first device mapping a same DMRS port to one or more of different PA, different SRS ports and/or different first signal ports in different subbands;
the first device mapping a same data stream of the first signal to one of more of different PAs, different SRS ports and/or different first signal ports in different subbands; a first transmission mode used by the first device;
a precoding matrix of the first signal being a codeword whose number of transmission streams is less than or equal to K, where K is an integer greater than or equal to 1;
a number of transmission streams of the first signal being less than or equal to M, where M is an integer greater than or equal to 1;
the precoding matrix of the first signal being a non-coherent codeword;
the precoding matrix of the first signal being a partially coherent codeword;
the precoding matrix of the first signal being the non-coherent codeword or the partially coherent codeword; and/or
the method further comprises:
sending third information to the first device, the third information indicating correspondence between the DMRS port and the SRS port; and/or
the method further comprises:
sending signaling to the first device, and the signaling is used by the first device to determine at least one of the following:
a precoding matrix used by the first signal and/or the DMRS port corresponding to the first signal in each subband in the frequency domain resource or the system bandwidth or the BWP where the first signal is scheduled;
a PA used by the first signal and/or the DMRS port corresponding to the first signal in each subband in the frequency domain resource or the system bandwidth or the BWP where the first signal is scheduled;

a SRS port corresponding to the first signal and/or the DMRS port corresponding to the first signal in each subband in the frequency domain resource or the system bandwidth or the BWP where the first signal is scheduled; and/or the method further comprises:

receiving signaling from the first device, the signaling indicating at least one of the following:

a precoding matrix used by the first signal in each subband in the frequency domain resource or the system bandwidth or the BWP where the first signal is scheduled;

a DMRS port corresponding to the first signal in each subband in the frequency domain resource or the system bandwidth or the BWP where the first signal is scheduled;

a PA used by the first signal in each subband in the frequency domain resource or the system bandwidth or the BWP where the first signal is scheduled;

a SRS port corresponding to the first signal in each subband in the frequency domain resource or the system bandwidth or the BWP where the first signal is scheduled;

a PA used by the DMRS corresponding to the first signal in each subband in the frequency domain resource or the system bandwidth or the BWP where the first signal is scheduled;

a SRS port corresponding to the DMRS port corresponding to the first signal in each subband in the frequency domain resource or the system bandwidth or the BWP where the first signal is scheduled.

19. The method according to claim 16, wherein the subband of the first signal is determined by at least one of the following:

determining by division according to a quantity of subbands and resources allocated by the second device for the first signal, wherein the quantity of subbands is pre-agreed by the first device and the second device;

determining according to subband division in a system bandwidth or the BWP of the first signal and scheduling information of the first signal;

obtained by division of the resources allocated for the first signal.

20. The method according to claim 19, wherein the subband in the system bandwidth or bandwidth portion of the first signal or in the scheduled resource of the first signal is determined according to a predefined subband division mode, wherein the predefined subband division mode includes:

the system bandwidth or BWP of the first signal or the scheduled resource of the first signal includes S subbands, and a minimum unit of each subband is P consecutive PRBs, in one subband, the minimum unit appears every P*S PRBs, wherein the P is an integer greater than or equal to 1, the S is a positive integer, and the S is configured by the network side or agreed by a protocol.

21. The method according to claim 16, further comprising:

determining a position offset of the subband in the frequency domain resource or the system bandwidth or the BWP in which the first signal is scheduled according to instruction information of the first device or a protocol agreement.

22. The method according to claim 16, further comprising:

sending resource indication information to the first device; wherein the resource indication information indicates at least one of:

a resource allocation situation of the first signal in an entire bandwidth or BWP;

a resource allocation situation of the first signal in a predefined subband;

a resource allocation situation of the first signal in one or more subbands.

23. The method according to claim 16, further comprising:

sending DMRS resource indication information and/or subband resource indication information to the first device, wherein the DMRS resource indication information indicates a frequency domain resource location of the DMRS port, the subband resource indication information indicates a frequency domain resource location of the subband.

24. A first device, comprising: a first transceiver and a first processor, wherein the first transceiver sends a first signal and a DMRS corresponding to the first signal to a second device, wherein the first signal includes at least one data stream, and each data stream corresponds to one DMRS port, one DMRS port corresponds to one or more of the following in different subbands: different power amplifiers (PAs), different sounding reference signal (SRS) ports, or different first signal ports;

wherein the first signal comprises at least one of: PUSCH, PUCCH, PDSCH, PDCCH.

25. A second device, comprising: a second transceiver and a second processor, wherein the second processor is configured to implement the data transmission method according to claim 16.

* * * * *